United States Patent [19]

Glassner et al.

[11] Patent Number: 5,384,901
[45] Date of Patent: Jan. 24, 1995

[54] METHOD OF RENDERING A COLOR IMAGE FOR AN OUTPUT MEDIUM FROM SYMBOLIC IMAGE DATA

[75] Inventors: Andrew S. Glassner, San Francisco; David H. Marimont, Palo Alto; Maureen C. Stone, Los Altos, all of Calif.

[73] Assignee: Xerox Corporation, Stamford, Conn.

[21] Appl. No.: 965,685

[22] Filed: Oct. 22, 1992

[51] Int. Cl.⁶ .............................................. G06F 15/20
[52] U.S. Cl. ................................................ 395/131
[58] Field of Search ....................... 340/703, 747, 750; 395/129, 131; 345/153, 154, 155; 358/456, 443, 80, 75

[56] References Cited

U.S. PATENT DOCUMENTS

| | | | |
|---|---|---|---|
| 5,070,413 | 12/1991 | Sullivan et al. | 358/456 |
| 5,103,407 | 4/1992 | Gabor | 395/131 |
| 5,148,518 | 9/1992 | Inoue | 395/131 |
| 5,191,406 | 3/1993 | Brandestini | 358/22 |
| 5,243,414 | 9/1993 | Dalrymple et al. | 358/500 |

FOREIGN PATENT DOCUMENTS 0475554  3/1992  European Pat. Off. ........ H04N 1/46

OTHER PUBLICATIONS

Séquin, Carlos H. and Eliot K. Smyrl, "Parameterized Ray Tracing", Proceedings of SIGGRAPH 1989 (Jul. 31–Aug. 4, 1989 Boston Mass.), in *Computer Graphics* 23 (Jul. 1989), pp. 307–314.

Gill, P., Murray, W., and Wright, M., *Practical Optimization*, Academic Press (1981), pp. 77–82; 133–141.

Glassner, A., "Surface Physics For Ray Tracing" in An Introduction to *Ray Tracing*, Glassner, A. ed., Academic Press, 1989, Chapter 4, Sections 1–3, pp. 121–143.

Stone et al., Color Gamut Mapping and the Printing of Digital Color Images. ACM Transaction on Graphics vol. 7, No. 4, Oct. 1988 pp. 249–292.

Stone et al., Color Gamut Mapping Computer Generated Imagery. Proceedings Graphic Interface '91 Jun. 3, 1991 Canada pp. 32–39.

*Primary Examiner*—Phu K. Nguyen
*Attorney, Agent, or Firm*—Judith C. Bares

[57] ABSTRACT

A method of rendering a color image on a designated output medium is disclosed which maps colors to the gamut of the designated output medium while preserving the semantic consistency of the object color and illumination information in the image. The method performs gamut mapping earlier in the image synthesis process than current gamut method methods, at the point where information about object primitives and their spectral attributes in a scene description is available, but after the fixed scene geometry has been determined by the rendering system. The method makes use of the output of a symbolic rendering system which produces symbolic pixel expressions, having basis spectra variables which represent the interplay of light and object primitives in the scene description, and spectral data having color information about the light and object primitives in the scene, and which is indexed to the basis spectra variables. The method performs spectral change calculations using the symbolic pixel expressions, the spectral data, and spectral information about the gamut of the specific output medium to determine the modifications to the original spectral data that need to be made to the individual object primitives in the scene in order to produce image pixel colors which are in the gamut of the output medium. The resulting image colors are locally and globally consistent with the semantics of the image, make effective use of as much of the available gamut of the display device as is possible, and require no further post-rendering gamut mapping prior to display or reproduction on the designated medium.

15 Claims, 14 Drawing Sheets

```
(* color.m - Andrew Glassner / Xerox PARC *)
(* Copyright © 1992 Xerox Corporation. All rights reserved. *)

ClearAll["Global`*"];

<< xyz.m
<< utility.m
<< configure.m (***********************************************)
(* Setup: initialize weights and normalizate spectra *)
(***********************************************)

buildJacobian := {
    (* replace symbolic spectra with instanced, weighted spectra *)
    tbl = Table[s[i] ->
        rgbSpectra[[i]] If[locked[[i]], weights[[i]], w[i]],
        {i, 1, Length[rgbSpectra]}];
    tbl = Append[tbl, s[0]->{0, 0, 0}];
    expandedPixels = workPixels /. tbl;

(* reshape to compensate for list levels created above *)
    rgbPixels = Partition[Flatten[expandedPixels],
        Reverse[Dimensions[expandedPixels]][[1]]];

(* compute the pixels/weights jacobian: each pixel wrt each weight *)
    jacobian = Map[D[rgbPixels, w[#]]&, Range[Length[weights]]];

(* now reform the jacobian so it is 2-dimensional *)
    rgbJacobian = Partition[Flatten[jacobian],
        Apply[Times, Drop[Dimensions[jacobian], 1]]];
};

(***********************************************)
(* The loop itself: the central step, and the control *)
(***********************************************)

(* a single step of the balancing loop *)
findDeltaWeights := {
    (* evaluate rgb for each pixel using current weights *)
    rgbs = rgbPixels /. Table[w[i]->weights[[i]], {i, 1, Length[weights]}];

(* find the movement vector to bring each pixel into gamut *)
    cDelta = Flatten[Map[unitDistance, rgbs, {2}]];

(* plug in the current weights into the Jacobian *)
    evalJacobian = N[
        rgbJacobian /. Table[w[i]->weights[[i]], {i, 1, Length[weights]}]];

(* find the distance the weights need to move to match cDelta *)
    wDelta = cDelta . PseudoInverse[evalJacobian];
};
```

FIG. 12A ← 160

```
(* color.m - Andrew Glassner / Xerox PARC - continued from FIG. 10A*)

(* the main balancing loop - output is finalSpectra *)
moveWeights[wd_, stepSize_] := {
    loopCount = 1;
    findDeltaWeights;
    While [Max[Abs[cDelta]]>wd,
        Print["loopCount = ", loopCount++];
        Print["  cDelta = ", cDelta];
        Print["  wDelta = ", wDelta];
        weights = weights + stepSize wDelta;
        (* clamp! *)
        weights = Map[Max[0, #]&, Map[Min[1.0, #]&, weights]];
        findDeltaWeights;
        ];
    findDeltaWeights;  (* one last time for data browsing *)
    finalSpectra = weights spectra;
    };

init := {
    weights = spectra = {};
    Map[normalizeSpectrum[#]&, rgbList];
    rgbSpectra = Map[Drop[#, 1][[1]]&, rgbList]/weights;
    xyzSpectra = Map[(RGBtoXYZ . #)&, rgbSpectra];
    locked = Table[False, {i, 1, Length[rgbSpectra]}];
    };

processPicture[num_, wd_, stepSize_] := {
    Print["Getting worst ", num, " pixels"];
    workPixels = getPixels[num];
    Print["topPixels: ", topPixels];
    Print["building the Jacobian"];
    buildJacobian;
    Print["adjusting the weights"];
    moveWeights[wd, stepSize];
    };

saveImage[filename_] := {
    OpenWrite[filename];
    stbl = Table[s[i]->weights[[i]] rgbSpectra[[i]],
            {i, 1, Length[weights]}];
    stbl = Join[stbl, {s[0]->{0, 0, 0}}];
    imgLen = Length[image];
    chunkSize = 100;
    Print["Counting to ", imgLen];
    Write[filename, imageSize[[1]], OutputForm[" "], imageSize[[2]]];
    Do[{
        Print[i];
        newP = Flatten[Round[255
            image[[i+Range[Min[chunkSize, 1+imgLen-i]]-1]] /. stbl]];
        Write[filename, newP];
        Print[Dimensions[newP]];
        },
        {i, 1, Length[image], chunkSize}];
    Close[filename];
    };
```

FIG. 12B

METHOD OF RENDERING A COLOR IMAGE FOR AN OUTPUT MEDIUM FROM SYMBOLIC IMAGE DATA

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates generally to the field of computer graphics software and to the rendering of computer-synthesized color images, and more particularly to a method for rendering computer-synthesized color images having image colors which are in the color gamut of a designated output medium.

BACKGROUND OF THE INVENTION

Computer graphics software and rendering systems provide for the computer synthesis and reproduction of realistic color images and are capable of producing images that include the entire range of visible colors. The broad functions of the typical, computer-based image creation process are illustrated in FIG. 13. As a scene is constructed by the scene designer, an application-specific model captures data about object primitives, and relationships among them, that comprise the scene, in box 20. The scene description, stored in an application database 22, contains descriptions of primitives that define the shapes of components, objects, and light sources in a scene, appearance attributes of the primitives such as color, and surface texture, and connectivity relationships that show how object primitives are positioned and fit together in the scene. The scene description must then be converted into the set of image pixels for display of the image on an output medium, typically on a monitor or in hardcopy form. The process of mapping the scene description to an image pixel file is typically referred to as "rendering", and the implementation of rendering is referred to as "the renderer", shown in FIG. 13 by dotted line box 24.

The specific processes performed in renderer 24 depend on the nature of the image to be produced and on the level of detail captured about the model in the image. The functions shown in boxes 26, 28, and 30 of renderer 24 illustrate a typical renderer for producing realistic images. The application database is traversed in box 26 to select scene description information (objects, attributes, and connectivity information) about the portion of the scene description that is to be viewed, and to convert the information into a format acceptable to the processes in the remainder of the renderer. Model transformation, viewing, and clipping routines, in box 28, scale, rotate, or translate the scene objects, and remove objects, surfaces, and parts of objects and surfaces that should not appear in the displayed image. This process is often referred to as hidden surface removal.

The shaded rendering process, in box 30, takes the transformed, clipped primitives for the objects in the selected view of the scene, simulates the illumination on and in the scene, according to a physically-based model, typically an approximation to the physics of light in the scene, in order to determine a pixel color for every pixel of every primitive in the scene, and produces the image pixels and pixel colors needed to display the scene. Shading attempts to simulate how light in the scene behaves at the surfaces of the objects in the scene. "Ray tracing", generally defined as an image synthesis technique using geometrical optics and rays to recursively evaluate shading and visibility, and "radiosity", generally defined as an image synthesis technique which balances the distribution of light energy in an environment, are two well known shaded rendering methods for image synthesis. Steps in a shaded rendering process typically include first determining which objects (or surfaces of objects) in the scene are seen by the observer from a selected scene viewing position, determining the light arriving at each point on each visible object surface in the scene, simulating the propagation of that light in the scene for that point, and assigning a color value to an image pixel as a function of the light reflected and transmitted at that point by the light sources and other objects in the scene. Once shaded rendering process 30 is completed, the image to be displayed is represented as a collection of individual image pixels, each with an associated pixel color. The image pixels, shown in memory device 32, are typically stored in a frame buffer from which they may be processed, via arrow 34 to box 48, by display routines appropriate for the specific device on which the image is to be generated, for display or reproduction on an output medium 49.

All of the colors physically producible on a particular color output medium is called the color "gamut" of the medium. The color gamut of an existing output medium is typically smaller than the set of all visible colors which are possible in a rendered image. Moreover, the scene description is typically created independently of the output medium on which it is subsequently displayed or reproduced. The algorithms used in shaded rendering process 30 for modeling the light striking a particular point on an object may very well generate a value for the color of one of the object's pixels that is not within the range of the valid values in the color gamut of the output medium, or that numerically represents a non-visible color, such as a negative value. In most instances, a "gamut mapping" process 40 is necessary to make sure that the color attribute for each pixel in the image is displayable or reproducible on the device selected for display or reproduction. Gamut mapping process 40 is described in more detail below, in conjunction with the discussion accompanying FIG. 1.

As can be seen from the functional steps illustrated in FIG. 13, changes that a scene designer may want to make to the image that involve the object primitive level of the image require changing the scene description database 22 and re-rendering the image, which is a computationally expensive procedure. This includes making changes to the colors of objects in an image, since information about objects, including their colors, is only available in the scene description 22. Otherwise, changes to the image made beyond rendering pipeline 24 must be made at the pixel level. Manually changing object or light source colors at the pixel level, while still maintaining the image realism, is difficult for the scene designer to accomplish accurately.

FIG. 1 illustrates a computer-based image creation process which permits a scene designer to manipulate scene description colors, surface properties, and light intensities without the computational expense of re-rendering the entire image. The method of FIG. 1 is described in detail by Carlos H. Séquin and Eliot K. Smyrl in "Parameterized Ray Tracing", Proceedings of SIGGRAPH 1989, Jul. 31–Aug. 4, 1989 Boston Mass., in *Computer Graphics* 23 (July 1989), pp. 307–314, (hereafter, "Séquin") which is hereby incorporated by reference. The method modifies a conventional ray tracing program of the type which could be used in shaded rendering process 30 of FIG. 13, to produce a parameterized, or symbolic, expression for each pixel as the scene is rendered. Rendering system 25 in FIG. 1 utilizes this modified symbolic shaded rendering process to produce a symbolic pixel expression for each pixel in the rendered image. The symbolic pixel expressions 80 are stored in a memory area. The process of FIG. 1 recognizes that the adjustment of the surface properties and light intensities leaves the scene geometry unchanged. The symbolic pixel expressions 80 explicitly contain, for each pixel in the final image, all potential contributions from the various surfaces hit by the ray and by its reflected and refracted secondary and higher order components, during the ray tracing process. The parameters in these expressions contain symbolic references to the colors and intensities of the various ambient and directional light sources and the coefficients defining the surface properties of the various objects. Color description data 84 contains color values and light intensity values defined by the scene designer for the scene description. Color description data 84, which are derived from the scene description database 22, may be produced by rendering system 25 as separate data, as shown in the separately illustrated file 84 in FIG. 1, or may be incorporated as part of symbolic pixel expression data 80. Each color and light intensity value in color description data 84 can be uniquely identified, such as with a label, index, or pointer, in order to permit the correspondence of an actual color or light intensity value with an associated symbolic reference to a color or intensity in the symbolic pixel expressions. This general indirect referencing arrangement is typically referred to as "indexing", and references hereafter to indexed color description data 84 will include any suitable indirect referencing arrangement for associating the actual color and light intensity values in color description data 84 to the corresponding symbolic references in the symbolic pixel expressions.

The symbolic pixel expression evaluator 82 substitutes the color values and light intensity values stored in color description data 84 for the symbolic color references in the parameters in the symbolic pixel expressions 80 to determine the final color for each pixel, creating the image pixel colors file 32 which represents the final color image. To change the surfaces and lights in a scene, the scene designer changes the color values and light intensity values for the scene description in color description data 84. Symbolic pixel expression evaluator 82 then substitutes the new color values and light intensity values for the symbolic color references in the parameters in the symbolic pixel expressions and recalculates the expressions for new pixel colors in the display. There is thus no need to re-render the scene. As noted in the Séquin paper, parameterization techniques similar to those described in association with ray tracing are applicable to other rendering algorithms which use fixed scene geometries.

The technique of producing symbolic pixel expressions illustrated in FIG. 1, while significantly reducing the time involved in changing colors and light intensities in a scene, may still produce final image pixel colors which are outside the gamut of the output medium which will display or reproduce the image, since the image is created independently of the output medium on which it is subsequently displayed or reproduced. Thus, as shown in FIG. 1, the pixel colors of image pixel file 32 most likely will need to be mapped to the specific color gamut of the output medium, in gamut mapping process 40, before display or reproduction.

Gamut mapping process 40 includes gamut mapping step 42 which applies information about the available color gamut of the output medium from device gamut data file 44 to automated mapping algorithms in order to bring out-of-gamut pixel colors inside the device gamut. Typically, device gamut data file 44 is comprised of data from a sample set of actual colors from the color gamut of the output medium, each of which has been physically measured by an appropriate instrument, such as a colorimeter or spectrophotometer. The output of gamut mapping step 42 is a modified set of image pixel colors, shown in data file 46, that are now in-gamut for a particular output medium. Since each device gamut is different, a new set of image pixel colors is created by the automated gamut mapping process for each output medium on which the image is to be displayed or reproduced.

The goal of gamut mapping is to fit the image colors into the gamut of the output medium while maintaining overall appearance of the image. The gamut mapping process has generally been the concern of those involved in the reproduction or display of color images, and typically has not been a processing goal of the graphics rendering pipeline 24 (FIG. 13) or symbolic shaded rendering system 25 (FIG. 1), nor a primary concern of the scene designer. It is a post-rendering step, accomplished typically by using various automated methods implemented in software which globally or locally modify individual pixel colors without regard to the objects in the image from which the pixels are derived. Gamut mapping may also be accomplished manually. Typically, the gamut of the output device is mathematically represented as a three-dimensional volume in a color space, and pixel colors are presented as points in the color space. One common automated gamut mapping method is a "uniform global scaling" of all of the pixels in the image such that the pixel colors most outside the gamut volume of the device are brought within the gamut region in the color space, and all other pixel colors are scaled in proportion. Uniform global scaling is conceptually similar to "turning down the light" in the scene description. In some, or perhaps many, cases, global scaling of the image pixel colors darkens and desaturates the resulting image unacceptably. Another common automated gamut mapping method involves the "local correction" of pixels, where each pixel is independently examined and brought into the gamut of the specific display device on which the image is to be produced. One undesirable effect of most methods of modifying the out-of-gamut pixels alone, apart from the objects in the scene, is the introduction of shading artifacts into the image.

Another highly undesirable effect of all gamut mapping done at the pixel level is to produce an image which is no longer semantically consistent with the interplay of light with objects in the scene. FIG. 2 of an image 50 illustrates the concept of image semantic inconsistency and highlights the problem with the existing process of modifying individual image pixels having out-of-gamut colors. FIG. 2 illustrates an image 50 of an outdoor street scene composed of a bright red fire truck 52 and an orange construction cone 54, both reflected in a window 55, which reflects only ten percent (10%) of the incident light at the particular viewing angle of the image. In the original synthesized image, suppose that the red color of fire truck 52 is twice as bright as the orange cone and brighter than the brightest displayable red in the gamut of the device on which image 50 is to be displayed, while the orange of construction cone 54 is just within the gamut. The reflections 56 and 58 of the two objects in window 55, generated by rendering pipeline 24 (FIG. 13), are semantically consistent with the original image; that is, the reflection 56 of fire truck 52 is twice as bright as the reflection 58 of the construction cone 54. Because of the darkening effect of the window glass, the red and orange colors of reflections 56 and 58 respectively are within the gamut of the device on which image 50 is to be displayed. The bright red color pixels comprising fire truck 52, generated by the processing in rendering pipeline 24, are undisplayable on the selected output device unless corrected. Uniform global scaling of the image pixel colors will darken both of the objects as well as their reflections, and darkening of the reflections may result in considerable loss of object detail. Local correction of only the out-of-gamut red pixels of fire truck 52 to bring them within the gamut of the device will result in a semantically inconsistent image where the reflections of the object reflect a different relationship between the relative brightness of the objects than what is seen between the objects themselves, once corrected for out-of-gamut colors. This type of semantic inconsistency resulting from a post-rendering gamut mapping process can arise in most rendered scenes which model diffuse and specular interreflection of light in the scene.

Automated gamut mapping methods which adjust colors at the pixel level cannot provide image semantic consistency. Thus, in order to achieve both in-gamut pixel colors and semantic consistency of object colors and lights in the image for the device on which the image is to be displayed or reproduced, the scene designer might try to make color changes to the objects in the scene description and re-render the image to try to bring the out-of-gamut colors in certain objects in gamut. If the scene designer is using a symbolic rendering system, such as the one illustrated in FIG. 1, re-rendering the scene would not be necessary, but manual adjustments to the colors in the scene would still be required. While this solution of changing the scene description produces semantically consistent images, it requires the manual adjustment of the scene description or the symbolic pixel expressions, which can be a time consuming process, especially if re-rendering is involved. Alternatively, after the rendering of the image is completed, a user might manually control parameters in automatic mapping algorithms in order to adjust, through trial and error and using artistic judgment, the individual out-of-gamut pixel colors for each of the pixels in the image in order to bring the pixel colors in-gamut in a manner which achieves or almost achieves semantic consistency. This solution, however, rarely provides image semantic consistency because of the complexity of the task, and requires a manual adjustment step which typically involves considerable trial and error because of the relatively unpredictable nature of the changes involved.

SUMMARY OF THE INVENTION

What is needed, therefore, is a method of rendering a color image with semantically consistent object colors that are always within the measured gamut of the specific output medium on which the image is to be reproduced or displayed, thus avoiding both the manual and automatic correction of image pixel colors which introduce image and object semantic inconsistencies during post-rendering pixel color adjustments. The method of the present invention is a device directed method of performing the gamut mapping process 40 of FIG. 1 earlier in the image synthesis and rendering process, at the point where information about object primitives and their color attributes in a scene description is available, but after the point where the fixed scene geometry has been determined by a conventional rendering method. The method uses the symbolic color image data and the color description data which are the output of a symbolic shaded rendering system. The symbolic color image data, in the form of symbolic pixel expressions, directly represent the interplay of light and object primitives in the original scene description. The color description data contain the light intensities and colors of the object primitives in the scene, which have been separated from the scene geometry itself, but which are associated with the symbolic color image data via unique identifiers such as indices. The method of the present invention is premised on the discovery that, since the light and color values have been separated from the scene geometry, they are available for modification with respect to the color gamut of a particular color reproduction device, and the effect on the original scene of every modification made to the the light and color values will be captured in the terms of the symbolic expressions. Thus, the method also uses device color data which represents the color gamut of the color output medium. Using the symbolic color image data, the indexed color description data, and the device gamut data, the method performs spectral change calculations to determine modifications to the indexed color description data that produce colors which are in the gamut of the color output medium, and which, when used with the symbolic color image data in a later step, will generate a target color image where each target color is one of the device colors in the gamut of the color reproduction device. The method of the present invention thereby preserves semantic image consistency in each rendering, without the need to re-render the image, by utilizing the symbolic pixel expressions and associated color descriptions to represent information about object primitive relationships in the rendered color image, and produces image pixel colors which make effective use of as much of the available gamut of the display device as is possible, and require no further post-rendering gamut mapping prior to display or reproduction of the image. In addition, the automated process of producing semantically consistent, in-gamut images can simply be performed again to reproduce or display the image another time on the same device, without the need to repeat time-consuming manual adjustments to pixel or scene object colors.

In accordance with further aspects of the present invention, the act of performing the spectral change calculations to produce modified indexed color descriptions includes the acts of determining color modification data for modifying the indexed color description data; evaluating the symbolic color image data with the modified indexed color description data to generate a color image; and generating the target color image from the color image using the device gamut color data to map each image color into one of the device colors in the gamut of the color reproduction device. Then, the target color image is compared to an image metric which measures whether the target is a valid target color image. If the target color image does not satisfy the image metric, the set of steps is repeated until the target color image satisfies the image metric: color modification data for modifying the modified indexed color description data is determined again; the symbolic color image data is again evaluated with the modified indexed color description data to produce another color image, which is then mapped to the device gamut to produce another target image, and the target image is again tested against the image metric.

In another aspect of the present invention, there is provided a method comprising the steps of assigning change variables, or weights, to the symbolic color image data; evaluating the symbolic color image data with the indexed color description data to generate a current color image composed of current colors; and generating a target color image composed of target colors from the current colors of the current color image using the device gamut color data. Then, calculating difference data between the current colors and the target colors is calculated. Using the difference data, incremental change quantities for the values of the change variables are determined in order to find the next set of values for the change variables. A test is then made to determine from the difference data and from the incremental change quantities whether the current color image satisfies image metric data. The image metric data includes relationship data for measuring a valid color image in terms of a relationship between the current color image and the target color image, and change variable data for measuring a minimum acceptable quantity for the incremental change quantities. If the current color image does not satisfy the image metric data, then the incremental change quantities are applied to update the current values of the change variables, and the above steps are repeated again, as long as the image metric is not satisfied. Once the image metric is satisfied, the current values of the change variables assigned to the symbolic color image data are applied to the corresponding indexed color description data to produce the modified color description data.

In accordance with another aspect of the present invention, there is provided a method of operating a machine. The machine has a memory and a processor connected for accessing and storing data in the memory. Data stored in the memory include indexed color description data items, each of which defines an original color of one of a plurality of object primitives in a scene description; symbolic color image data items having symbolic spectral components indexing the indexed color description data items to the symbolic color image data items; and mathematical operators combining the symbolic spectral components into a single symbolic expression. Each symbolic color image data item defines one of a plurality of image pixel color data items composing a color image rendered from the scene description. Also stored in the memory of the machine are device gamut color data items representing for a color reproduction device a gamut of device colors capable of reproduction by the device, and image metric data which represents the desired relationship between the plurality of image pixel color data items composing the color image and a plurality of target image pixel color data items composing a target color image. The method of operating the machine comprises steps for operating the processor of the machine to take actions on the data in the memory in order to produce modified indexed color description data. Specifically the method comprises the steps of operating the processor to determine and assign change variables to the symbolic spectral components in the symbolic color image data items stored in the memory of the machine; operating the processor to determine a new value for at least one change variable to produce modified symbolic spectral components; operating the processor to evaluate each modified symbolic spectral component of each symbolic color image data item with the indexed color description data items to produce image pixel color data items composing a color image; and operating the processor to use the device gamut color data items to generate target image pixel color data items composing a target color image from the image pixel color data items composing the color image so that each target image pixel color data item represents one of the device colors capable of reproduction by the device. The method of operating the machine further comprises operating the processor to determine if the color image currently generated satisfies the relationship between a color image and a target image represented by the image metric data. If the color image does not satisfy the image metric, further modifications to the change variables are needed, and the method continues with operating the processor to repeat the above steps until the color image satisfies the image metric data. Then, the method operates the processor to apply the new value of each change variable to the indexed color description data item indexed to the symbolic spectral component to generate the modified indexed color description data items.

In accordance with still another aspect of the present invention, there is provided a machine comprising input circuitry for obtaining data items; memory for storing data; and output circuitry for connecting the machine to an output medium and for transferring selected data from the memory to the output medium. The machine further includes a processor for executing instructions, and connected for accessing the input circuitry to receive the data, for accessing data stored in the memory; and for transferring data from memory to the output circuitry. The data obtained by the input circuitry includes symbolic color image data items and indexed color description data items defining original colors of one of a plurality of object primitives in a scene description. Each symbolic color image data item obtained by the input circuitry defines one of a plurality of image pixel color data items composing a color image rendered from the scene description, and has at least one symbolic spectral component indexing the indexed color description data items to the symbolic color image data item. The data stored in the memory of the machine include device gamut color data items representing a gamut of device colors capable of reproduction by a color reproduction device, and instruction data indicating instructions the processor executes. The processor, in executing the instructions, performs spectral change calculations with the symbolic color image data items, the indexed color description data items, and the device gamut color data items to produce modified color description data items with which the processor can produce, together with the symbolic color image data items, a plurality of image pixel color data items composing a color image, where each pixel color is one of the device colors in the gamut of the color reproduction device. The processor further, in executing the instructions, stores the modified color description data items in the memory.

BRIEF DESCRIPTION OF THE DRAWINGS

Other aspects of the present invention will become apparent as the following description proceeds and upon reference to the drawings, in which:

FIGS. 12A and 12B contain computer program source code written in the Mathematica language to perform the steps illustrated in FIG. 7.

DETAILED DESCRIPTION OF THE INVENTION

The novel features that are considered characteristic of the present invention are set forth with particularity in the appended claims. The invention itself, however, both as to its organization and method of operation, together with its advantages, will best be understood from the following description of the illustrated embodiment when read in connection with the accompanying drawings. In the Figures, the same numbers have been used to denote the same elements.

A. Method Overview

Figure 3:
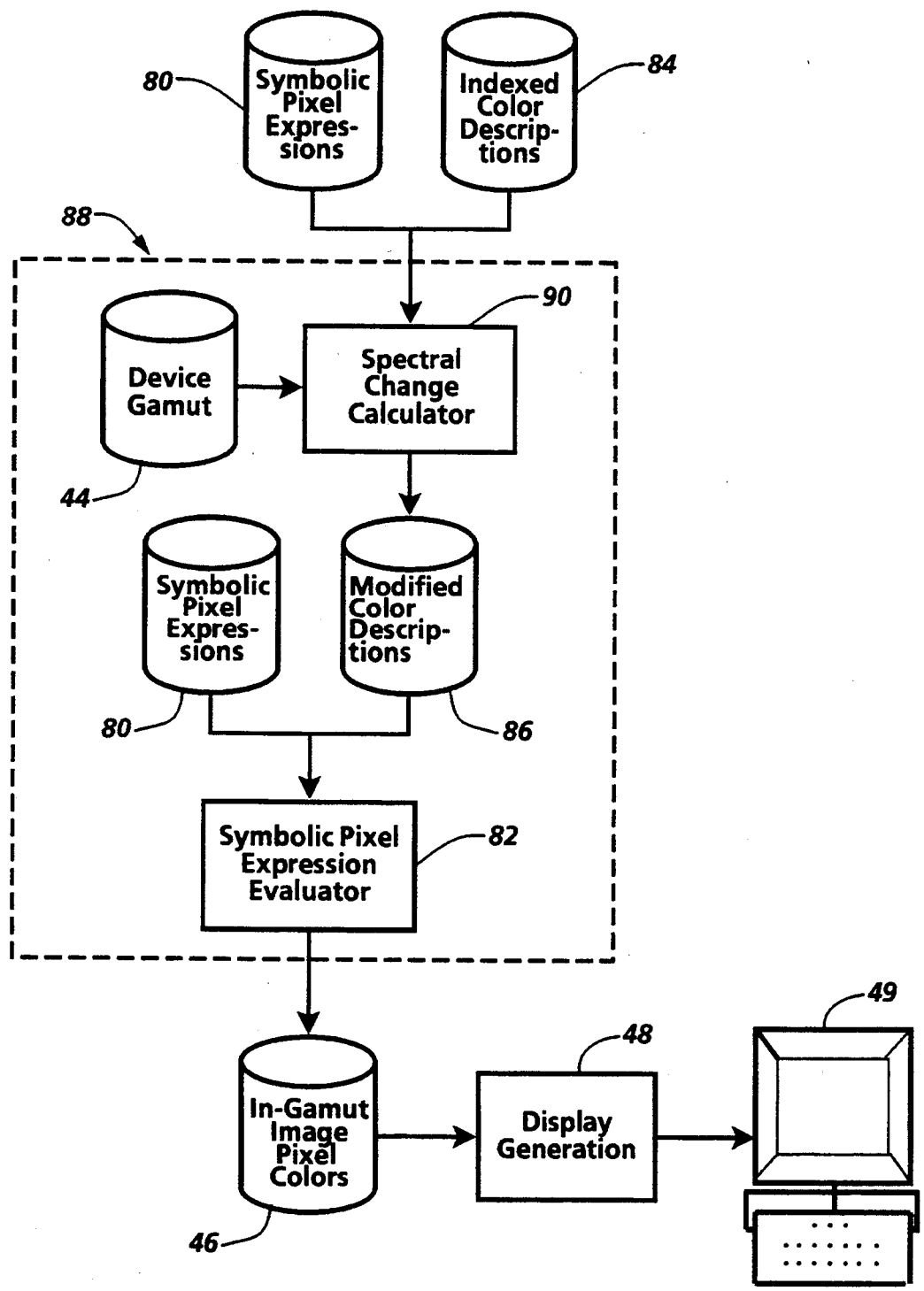
FIG. 3 is a block diagram illustrating the data flow for color image rendering using the method of device directed rendering according to the present invention.

With reference now to FIG. 3, the device directed method for rendering a color image, illustrated as spectral change calculator 90 in FIG. 3, uses as input the original color and light intensity values for the scene description in indexed color description data 84 and symbolic color image data, called symbolic pixel expressions 80, both generated by rendering system 25, and device gamut color data 44, defining the colors capable of reproduction by color device 49. The method performs spectral change calculations to produce as its output, a set of modified color descriptions 86 which are modified color and light intensity values for the scene description. When the modified color descriptions 86 are used, along with the symbolic pixel expressions 80, in the symbolic pixel expression evaluator 82, image pixel color data 46 composing a color image is produced which has pixel colors which are substantially all in the device gamut of device 49. The modified color description data 86, together with the symbolic pixel expressions 80, now represent the color image rendered for device 49, and no gamut mapping step prior to display or reproduction is needed to ensure displayable colors on output medium 49. It is not necessary to perform evaluation step 82, however, until a user or viewer of the color image is ready to display or reproduce the image.

Figure 2:
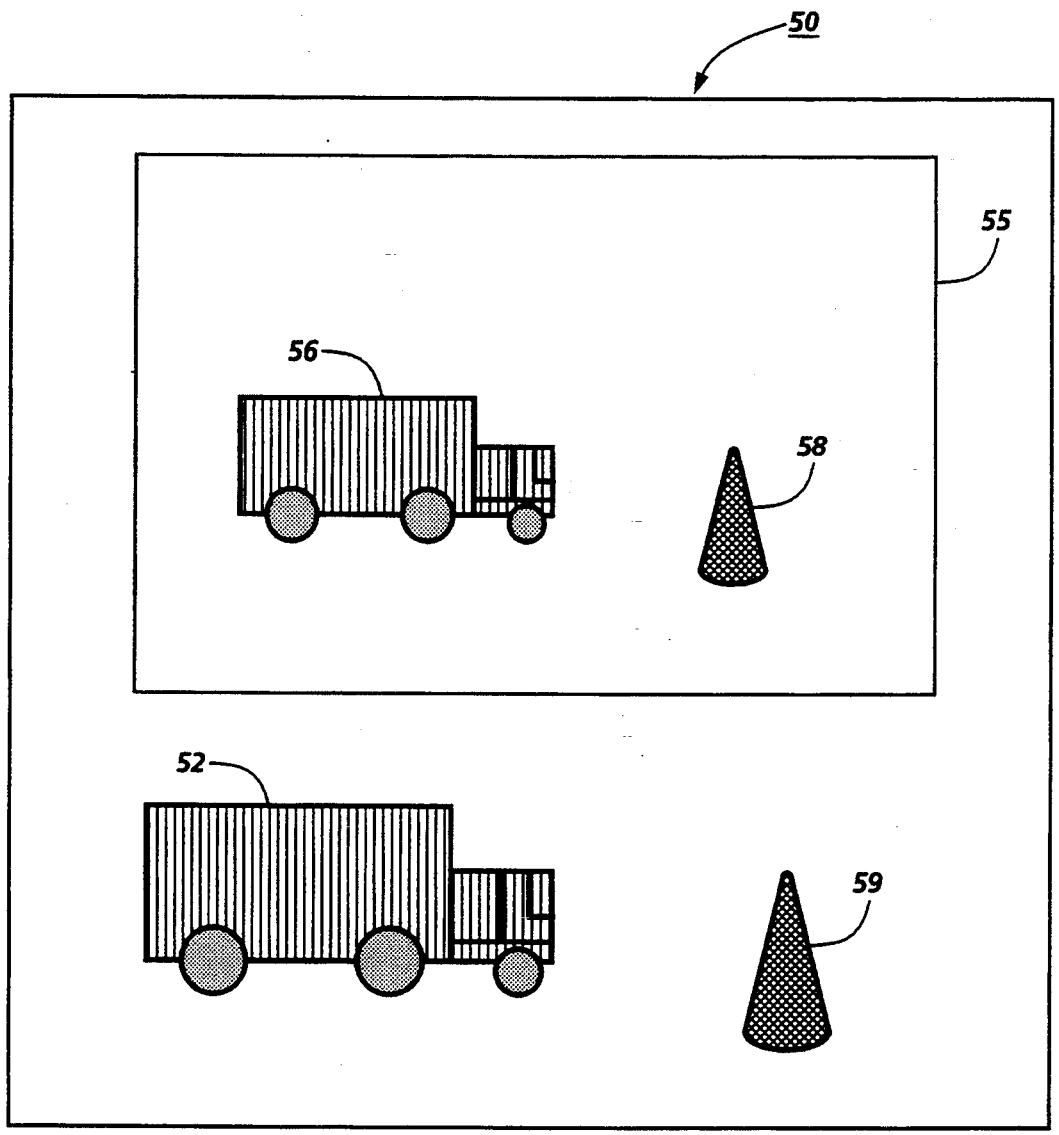
FIG. 2 is a schematic view of objects in a rendered color image.

The method of the present invention produces a semantically consistent rendered color image and maintains this image semantic consistency while the final image colors are brought within the gamut of the designated output medium, without the computationally expensive step of re-rendering the image or the time-consuming post-rendering step of manual pixel color adjustment. Because the symbolic pixel expressions 80 maintain picture information in a symbolic form at the object primitive level, any changes to the color and light intensity values which are substituted in the terms of the expressions result in changes at the object level in the color image, thus changing not only object colors, but also changing the portions of the image that are affected by the changes in object colors. This occurs because the method 90 of the present invention simultaneously changes all of the appropriate symbolic color terms wherever they occur in the symbolic pixel expressions 80. All image pixels which have light contributions from an object primitive with a changed color value are thus changed, and the image remains semantically consistent while the colors are brought in gamut for the designated output medium. Utilizing the method of device directed rendering for rendering the image 50 of an outdoor street scene in FIG. 2 for a particular output medium would result in bringing the red pixels of bright red fire truck 52 into the gamut of the output medium, while also maintaining the brightness relationship between fire truck 52 and construction cone 54 in the colors of their reflections in the window 55.

Figure 4:
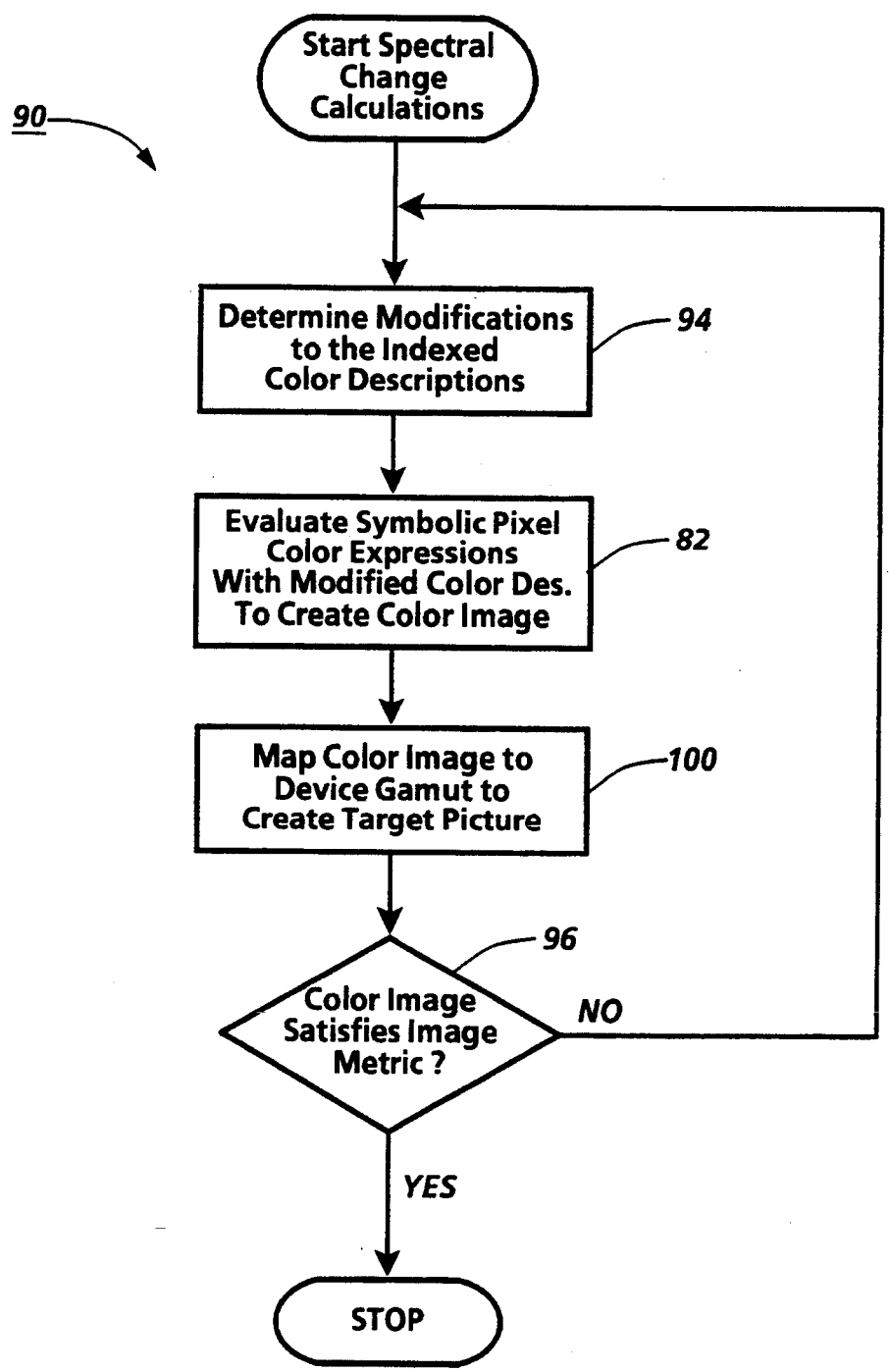
FIG. 4 is a block diagram illustrating the functional steps for the method of device directed rendering shown as block 90 in FIG. 3.

FIG. 4 illustrates the broad steps of performing the spectral change calculations. Each of the originally defined color and light intensity values for the scene description 22 in indexed color description data 84 is modified, in box 94. The details describing one way in which the color descriptions are modified is set forth below, with respect to the illustrated embodiment. Generally, the color descriptions must be modified in a manner which, when all of the modified color descriptions are evaluated in the symbolic pixel expressions 80 to produce a color image for display, in symbolic pixel expression evaluator 82, the color image which is produced by symbolic pixel expression evaluator 82 is composed of pixel colors in the device gamut 44 of device 49. Typically, the color descriptions will be modified in a manner which results in the modified color being in device gamut 44, although they may be adjusted to meet other similar criteria. The modifications need not be directly made to the values of the original colors in indexed color description data 84. Since the original colors are indexed to and represented in the symbolic pixel expressions, manipulations of the symbolic color terms in the symbolic pixel expressions, which result in modifying the values of the color descriptions when they are substituted in the symbolic pixel expressions, may also accomplish the necessary modifications indirectly.

Once a first set of modifications to the indexed color description data 84 has been made, the modified color descriptions are evaluated, in box 82, in the symbolic pixel expressions 80 to produce a color image. Evaluation step 82 is substantively similar to evaluation step 82 in FIG. 1.

In box 100, each image pixel color in the color image is mapped to the device gamut of a specific display or reproduction device (shown as device 49 in FIG. 3) using a conventional gamut mapping process. Typically, the device gamut of a device is conceptually and mathematically represented as a three-dimensional volume in color space, and a mapping process finds a desirable replacement color in the device gamut for the out-of-gamut color, according to a mathematical algorithm for finding a desirable replacement. The device gamut, however, may also be represented in other ways, such as, for example, as simply a look-up table of measured color values for valid device colors. Device gamut data 44 include the data needed to represent the gamut in the manner selected by the implementation. The act of mapping each pixel color in the current color image to the device gamut using device gamut data 44 generates a target color image having all pixel colors in the gamut of device 49.

The inquiry in box 96 tests whether the target image generated in box 100 satisfies an image metric which measures whether the target image is a valid target image. The image metric, in its simplest form, may simply require that all evaluated symbolic pixel expressions 80 produce in-gamut pixel colors. However, there may be many modifications to the original color descriptions in indexed color description data 84 which would produce one or more color images having substantially all pixel colors in the device gamut represented by device gamut data 44. The image metric may determine which one or ones of the possible target color images are valid target color images. The image metric may also provide for modifications to the color descriptions to stop within a certain number of processing cycles (in which case any remaining out-of-gamut pixel colors will remain out-of-gamut).

The determination of validity of a target color image may be established in a number of ways, and a specific image metric is described in more detail below with respect to the illustrated embodiment. Generally, the goal of the device directed rendering method of the present invention is to find a set of color values for the colors of the objects and lights in the rendered image which are in the device gamut represented by device gamut data 44, and which produce an image which is acceptable, for some measurement of "acceptable". Thus, the validity measurement of the image metric is typically a measurement of target color image acceptability to the user of the method. In one embodiment of the method, the acceptability measurement of the target color image is stated in terms of, or as a function of, the original color image rendered by rendering system 25. An original color image, also called an "ideal" color image, may be generated by evaluating (using symbolic pixel expression evaluator 82) the symbolic pixel expressions with the original indexed color descriptions 84, prior to modification, and each target color image generated may be compared in some manner to the ideal color image to determine validity as a measure of whether the target color image is an acceptable substitute for the ideal color image. The image metric may also, for example, or provide a measurement of the perceptual suitability of an arbitrary image as a substitute for the original, ideal image.

If the image metric has been satisfied, the indexed color descriptions as currently modified are the color descriptions to be saved as in-gamut color description data 86 (FIG. 3). The modified, in-gamut color descriptions 86 are the set of color descriptions which produce an in-gamut target picture which satisfies the measurement expressed in the image metric, and which, together with the symbolic pixel expressions 80, produce the valid in-gamut target picture.

If, however, the modified color descriptions do not produce the in-gamut target picture which satisfies the image metric, the process flow returns to repeat the modification, evaluation, and mapping steps. It may be possible, in a particular implementation of the method steps illustrated in FIG. 4, to simultaneously modify all of the indexed color descriptions that require modification to produce the target color image which satisfies the image metric. In that implementation, the image metric would be satisfied with the first target color image produced from modified color descriptions, and the method would terminate without repeating steps 94, 82, and 100.

B. The Mathematical Model of the Illustrated Embodiment

The discussion next turns to describing a specific implementation for the method of the present invention illustrated in FIGS. 3 and 4 for performing the spectral change calculations 90 to produce the modified, in-gamut color descriptions 86.

1. The Rendering System

The method of the present invention begins with the output generated by rendering system 25 (FIG. 1): the symbolic pixel expressions 80 and the indexed color descriptions 84. Some additional information about the creation and content of these files by rendering system 25 is provided first, before discussing the steps of device directed rendering method 90 in more detail. The creation of the scene and the scene description database are accomplished in the same manner as described and shown in FIGS. 12 and 1 above, utilizing known modeling, painting, or other software tools for creating images. The scene description contains descriptions of primitives that define the shapes of components, objects, and light sources in an image, appearance attributes of the primitives such as transparency, color, and surface texture, and connectivity relationships that show how objects are positioned and fit together in the image. In the illustrated embodiment, each color of an object surface or illuminant in the scene description 22 (FIG. 1) is represented as a single spectral function of wavelength. For an illuminant, the spectrum represents the amount of power at each wavelength; for a surface, the spectrum represents the amount of incident light reflected at each wavelength. However, the method of the present invention is intended to also cover other illumination and reflection models.

The scene description is then provided to rendering system 25 which produces an image, or picture, in symbolic form having one symbolic pixel expression 80 for each image pixel. Renderer 25 in the illustrated embodiment is a ray tracer, modified to produce symbolic pixel expressions 80 suitable for use in the method of the present invention. The ray tracing method assumed one ray per pixel. The method of the present invention, however, is suitable for use with other rendering models, shading equations, and screen sampling patterns.

Figure 11:
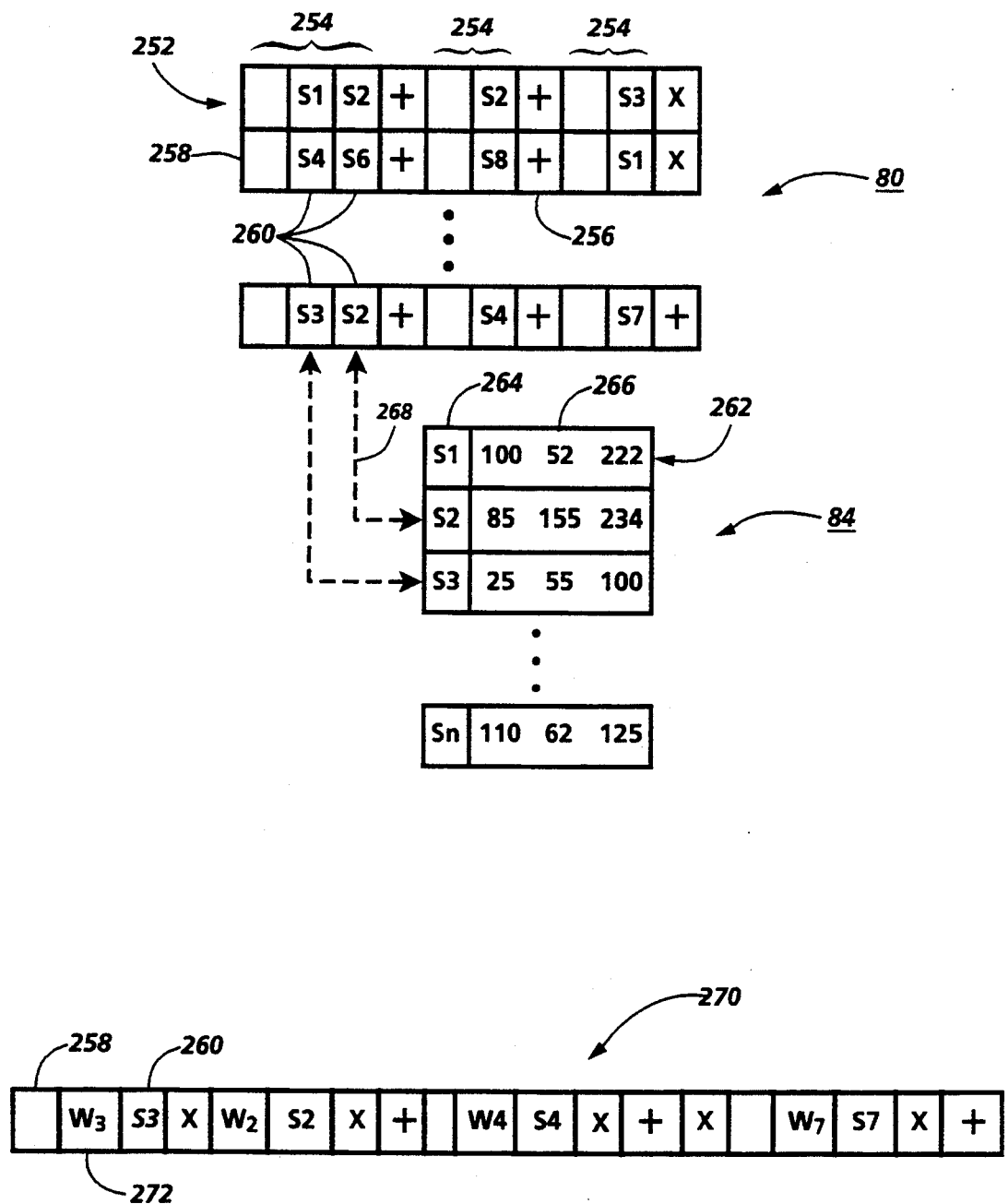
FIG. 11 illustrates schematically representative data structures used by the present invention.
Figure 13:
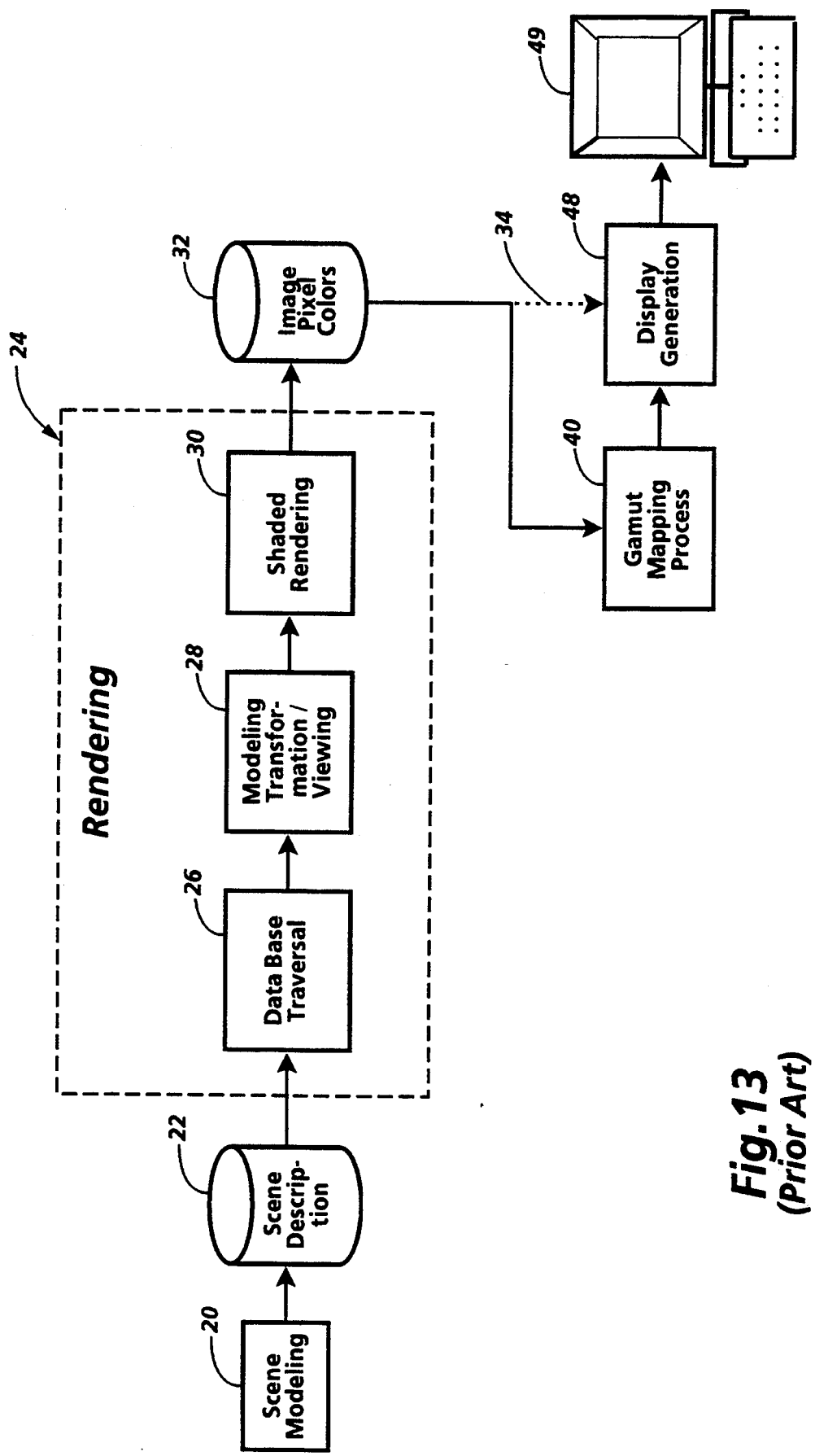
FIG. 13 is a block diagram illustrating the broad functional steps in prior art systems for computer-based image synthesis and rendering.

During the rendering of scene description 22, renderer 25 assigns an index to each unique color in the scene, from both illuminants and surface reflections. The indices along with their associated color descriptions (spectra) are also an output of rendering system 25, either as a separate file of indexed color descriptions 84 as shown, or as part of the file of symbolic pixel expressions 80. FIG. 11 illustrates a representative structure for the file 84 of data items comprising the indexed color descriptions. The number of indexed color description data items depends on the number of unique color and light intensity values that exist in the scene description. A single indexed color description data item 262 is composed of an index field 264 and a color, or spectrum, data field 266 containing color information. In illustrated data field 266, the color information is represented as RGB information, but any data format suitable for representing and encoding color information may be used. In the implemented embodiment, the color information is represented as an array of floating point numbers defining a color as a set of spectral samples.

2. Symbolic Pixel Expressions

Each symbolic pixel expression represents all of the color contributions from objects and lights in the scene at that pixel, or, more precisely, the sum of the combined diffuse and specular reflections of the light propagated from the surface of an object to the observer's eye. To produce the symbolic pixel expressions 80, rendering system 25 multiplies together the spectra of the scene surfaces and the lights to form the components, or terms, of the symbolic expressions 80, called "basis spectra", which in turn are added to produce the color at each pixel. Each basis spectrum component term in a single expression also has an associated constant that depends on the geometry of the intersection and properties of the surface. Specifically, the expressions are made up of real numbers, arithmetic operators, parentheses, and color symbols (spectral references), as described in Séquin. For example, a color with the index of 3 may be referenced in a symbolic pixel expression simply as "s3". The parameters in each expression, when evaluated with actual color values, such as those provided in the original scene description 22, together define the spectral power density (SPD) of incident light at an image pixel.

An example of how a symbolic pixel expression of component basis spectra terms is constructed by rendering system 25 illustrates this process more clearly. Assume that a scene description 22 consists of one illuminant with a spectrum designated as $S_1(\lambda)$, and one surface with spectral reflectance function $S_2(\lambda)$, where $\lambda$ denotes wavelength. $E(\lambda)$ denotes the spectrum of a pixel that receives a ray that carries light from the illuminant and is reflected from a plastic surface into the pixel. The simple shading model of renderer 25 produces a relationship of the form:

$$E(\lambda) = c_1 S_1(\lambda) S_2(\lambda) + c_2 S_1(\lambda) \tag{1}$$

where the $c_1$ and $c_2$ are the scalar constants which are functions of the relative geometry of the illuminants and surfaces and the physical properties of the surfaces. Note that scalars $c_1$ and $c_2$ are important for rendering the final image and are shown for completeness, but are not important to the method of the present invention. The two terms on the right hand side of Equation (1) correspond to the diffuse and specular components of the light reflected from the plastic surface provided as the example. In more complex scene instances, additional "bounces" of a ray through the scene (i.e., the levels in the ray tree constructed by the ray tracer) results in additional spectra being multiplied together, resulting in turn in a high-order polynomial in the spectra. Actual experience with the implementation of the present illustrated embodiment shows that the ray tree usually does not exceed two or three levels, which prevents the order of the polynomials at the pixels from rising too high.

FIG. 11 illustrates a representative data structure for symbolic pixel expression file 80. A single symbolic pixel expression 252, representing the color information for a single pixel in the color image, is composed of basis spectra terms 254 and arithmetic operators 256. Each basis spectra term 254 includes one or more data areas 258 for data produced by rendering system 25 not directly related to spectral data, such as the scalars $c_1$ and $c_2$ discussed above, and one or more symbolic spectral components 260 which are, in effect, indices into indexed color description data items 84. The use of an indexing scheme to create indirect referencing between a symbolic pixel expression 252 and color description data 84 is an efficient implementation over using actual color description data in the symbolic pixel expressions, and as noted earlier, any suitable indirect referencing arrangement may be used for associating the actual color and light intensity values in color description data 84 to the corresponding symbolic spectral components in the symbolic pixel expressions. The symbolic spectral components 260 are used for indexing into the indexed color description data 84, as shown by arrow 268, to retrieve the corresponding color information data, or spectrum data, needed to evaluate the symbolic pixel expression to produce the image pixel color.

The basis spectra terms in each symbolic pixel expression are preferably converted to tristimulus values describing vectors in tristimulus space using a "tristimulus operator", T, such that $T[E(\lambda)] = x$, where x is the three-vector containing the tristimulus values XYZ corresponding to $E(\lambda)$. If $T[S_1(\lambda)S_2(\lambda)] = x_{12}$ and $T[S_1(\lambda)] = x_1$, then applying the tristimulus operator to both sides of Equation (1) yields a linear combination of tristimulus vectors:

$$T[E(\lambda)] = T[c_1 S_1(\lambda) S_2(\lambda) + c_2 S_1(\lambda)] \tag{2}$$

$$x = c_1 T[S_1(\lambda) S_2(\lambda)] + c_2 T[S_1(\lambda)] \tag{3}$$

$$= c_1 x_{12} + c_2 x_1 \tag{4}$$

When this conversion is performed is an implementation decision, and the basis spectra terms may be converted to tristimulus vector terms by rendering system 25, after the ray tracing step, as in the illustrated embodiment, or later, as an initial process in device directed rendering step 90. The final color of each pixel in the rendered image is thus defined, in the symbolic pixel expression, as the sum of one or more of the tristimulus vector terms. In the illustrated embodiment, then, color representation and manipulation is performed in the tristimulus color space model. Color representation and manipulation may also be carried out in other color spaces, since the tristimulus vectors may be converted further into other color models such as CIE color space models, and the RGB or HSV color models, through mathematical conversions well known in the art. Additional processing considerations must be taken into account, however, if a color space is used which is a nonlinear transformation away from the tristimulus color space model.

3. The Mathematical Model

The illustrated embodiment of the present invention is based on mathematical models shown in FIGS. 5 and 6. The implementation of the mathematical models is handled as an optimization problem. Because the spectrum, or color description, for one object or light primitive in scene description 22 (FIG. 2) may appear in more than one symbolic pixel expression 80, a modification to one color description may correct some out-of-gamut pixel colors while producing other pixel colors which were formerly in-gamut but become out-of-gamut as a result of the modification. Thus, the problem of directly modifying the original color descriptions to produce an in-gamut image is typically more complex than simply bringing all of the color descriptions into the gamut of the selected output device. In addition, any single set of modifications directly to the original color descriptions could produce an image having all in-gamut pixel colors, but that image may not satisfy the image metric. Thus, determining modifications to the original color descriptions in an efficient manner requires finding a set of optimal modifications to make to one or more of the color descriptions simultaneously which both produce an in-gamut, or target, color image and which is a valid target picture as defined by the image metric. Since, when suitable color descriptions are substituted for the symbols in the basis spectra terms, the symbolic pixel expressions ultimately determine all of the image pixel colors, the modifications to the original color descriptions can be efficiently determined indirectly, by manipulating the symbols representing the original color descriptions in the basis spectra terms in such a manner as to be able to apply the manipulations to the original color descriptions to determine the modified color descriptions.

The mathematical model of the illustrated embodiment, to be described in detail below, is summarized as follows. The model defines an original rendered image, also known as the ideal image, as a "picture" represented in "picture space". The picture is defined as a function of the basis spectra (color descriptions 84). Each spectrum may be scaled by a weight to adjust its color. Because the spectra are physical representations of colors, the weights must meet certain criteria, and so, of all weights in "weight space", there is subset of weights which are valid. The subset of valid weights when applied to the spectra produce a subset of valid pictures in picture space. Because a picture is a function of the spectra, and each spectrum is a function of one or more weights, a valid picture may be expressed as a continuous function of the weights, and the subset of valid pictures define a subset in picture space. A device gamut also defines a subset in picture space. A "target picture" is defined as a picture which has image pixel colors that are reproducible colors in the device gamut. The target picture may be found by applying a gamut mapping function to the original ideal image. There is some set of weights which meet the following constraints: the set of weights produces a valid picture in picture space; the picture produced is also in the device gamut of picture space; and the picture produced meets some objective function, called the image metric or "goodness function" which describes the desired relationship between the original picture in picture space and a target picture in the gamut subspace of picture space. Optimization of this mathematical model attempts to find the optimal set of values for the weights that are needed to meet these constraints. The details of this model follow.

a. Scaling Spectra with Weights

In each symbolic pixel expression, tristimulus vector terms represent individual color contributions from object and light primitives in the scene to the final pixel color represented by the expression. The tristimulus vector terms, in turn, were converted from basis spectra, and so represent the scene spectra (objects and lights) which affect the color in the particular pixel represented by the expression. Typically, the basis spectra occur as terms in multiple symbolic pixel expressions, because the lights and the objects in the scene influence the color in many individual pixels.

Figure 5A:
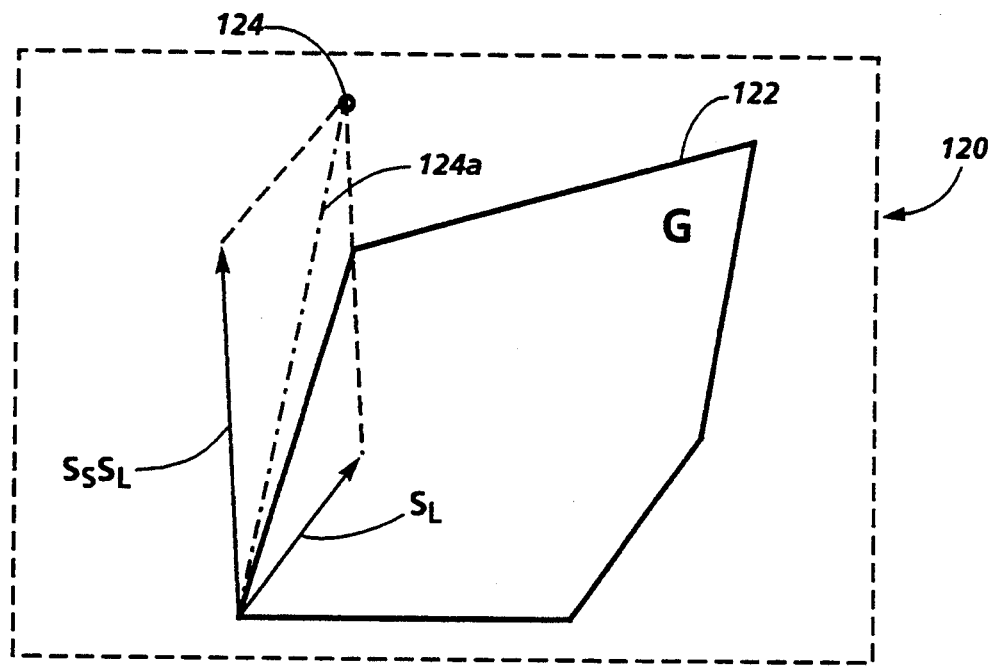
FIGS. 5A and 5B diagrammatically illustrate using weighted vectors according to one embodiment of the present invention to represent colors in a color space, and modifying the weights to change the colors.
Figure 5B:
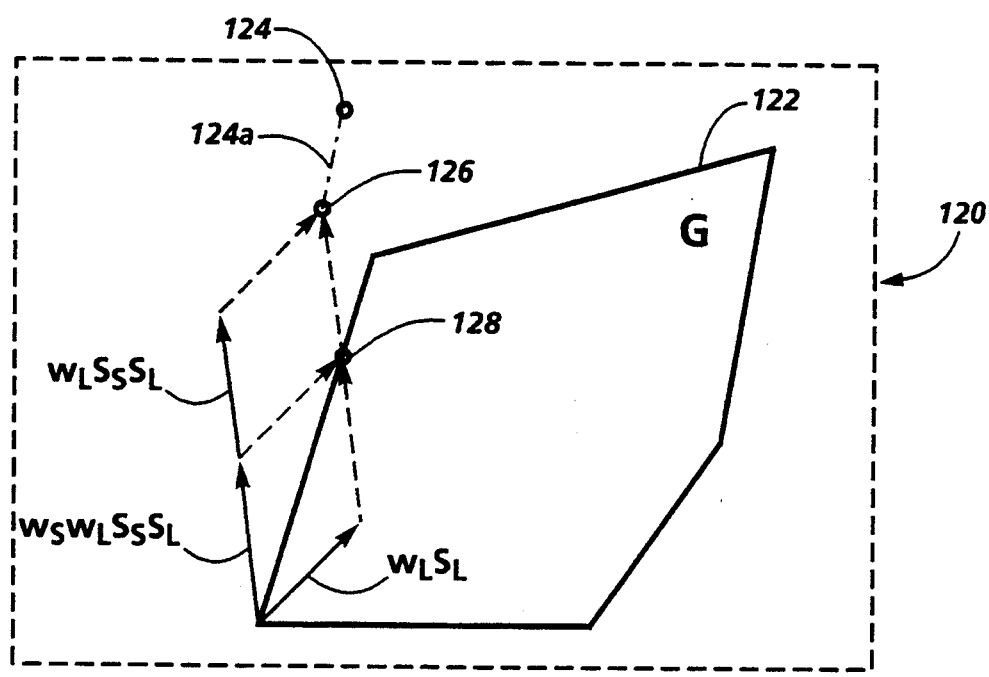

FIGS. 5A and 5B illustrate the concept of basis spectra as vectors in the color model known as tristimulus space. Note that FIGS. 5A and 5B illustrate a two-dimensional example, simplified from the three-dimensional model implemented in the illustrated embodiment, and that the vectors shown demonstrate only one of the possible symbolic expressions for a pixel. In FIG. 5A, dotted line box 120 represents the volume of tristimulus space. Within tristimulus space 120, a subset 122 of tristimulus space represents the gamut of a particular output medium, also denoted "G" in FIG. 5A. The color of a light source, L, in the image to be rendered is represented by the vector in tristimulus space 120 denoted $S_L$. Similarly, the color of a surface, $S_S$, illuminated by light source, L, in the image is represented by the product of $S_S$ and $S_L$, denoted $S_S S_L$. A pixel 124 in the image has a color which is determined by the sum of $S_S S_L$ and $S_L$. Pixel 124 happens to be outside of gamut 122.

For the case where the color of any pixel in the rendered image is out of gamut, the individual scene spectra, S, for either the object surfaces ($S_S$) or the light intensities ($S_L$), or both, in the symbolic pixel expression which generated the out-of-gamut pixel, are adjusted, or scaled, by a weight, w, in order to bring the vectors representing the scene spectra closer to the volume bounded by gamut G. In an initial processing step of device directed rendering method 90, each spectral function $S_i(\lambda)$ (an original color description symbol or index) in Equation (1) is replaced with $w_i S_i(\lambda)$, a weighted color description symbol or index. Applying the tristimulus operator T to both sides of Equation (1), as done above in Equations (2), (3), and (4), yields:

$$x = (c_1 x_{12}) w_1 w_2 + (c_2 x_1) w_1 \tag{5}$$

Because x is a tristimulus vector, Equation (5) defines three equations, each a polynomial in the weights.

FIG. 5B illustrates how individual weights applied to scene spectra bring individual pixels into the gamut of the output medium. Pixel 124 and gamut 122 are shown in the same positions they have in tristimulus space 120 of FIG. 5A. In the illustrated embodiment, a pixel defined by a single vector can only be brought into gamut if the line along the vector intersects the device gamut. Thus, if the pixel color at point 124 in tristimulus space were defined only by a single vector along line 124a, a single weight applied to the vector would not be able to bring the pixel color into gamut 122, since it would scale the color only along line 124a. However, since pixel 124 in FIG. 5A is defined as a sum of vectors, the pixel color can be corrected (i.e., brought into gamut 122) by scaling the weights of the light source and surface spectra as long as the plane or volume bounded by the vectors intersects the device gamut. In FIG. 5A, in essence, vector $S_S S_L$ has been scaled with weights having values of one (1). In FIG. 5B, two corrections are shown. The basis spectrum of light source, L, has been scaled by weight $w_L$ and the product of the spectrum and the weight results in a new vector in tristimulus space 120, denoted $w_L S_L$. Weight, $w_L$, has also been applied to the spectrum of light source L in basis spectrum (product vector) $S_S S_L$. Scaling the spectra with weight $w_L$ will change the pixel value in a manner defined by the rules of vector algebra. Thus, the new product vector in tristimulus space 120 denoted $w_L S_S S_L$ represents a pixel color that has changed from position 124 to position 126 in tristimulus space. Because only a single weight has been applied, the scaling results in pixel color 124 changing along line 124a to point 126, toward the origin point of gamut 122. In effect, such a change only results in changing the brightness of the pixel color, and not its chromaticity. Pixel color 126 is closer to the boundary of gamut 122, although it is still an out of gamut color. Applying weight $w_S$ and scaling the spectrum of surface $S_S$ results in a new product vector in tristimulus space 120, denoted $w_S w_L S_S S_L$, representing a new pixel color 128 in tristimulus space which is now within the boundary of gamut 122. Pixel color 128 is now capable of reproduction in the selected output medium represented by gamut 122.

In the weight system of the illustrated embodiment, there is a single weight for each spectral function, and each weight must meet certain constraints. If the total number of weights is M, each weight is mathematically represented as a component of M-dimensional vector, w. A particular set of weights defines a point in an M-dimensional Euclidian "weight space". Because the spectral functions have a physical interpretation, they cannot be scaled arbitrarily. The weight that scales a spectral function must be chosen so that the scaled spectral function is physically realizable. In general, weights are positive and nonzero. Surface reflectance functions cannot have values greater than 1.0. W denotes the subset of M-dimensional weight space containing all possible w's that produce physically realizable scaled spectral functions.

FIG. 11 illustrates a representative data structure for a single symbolic pixel expression 270 scaled with weights. A single unique weight 272 is assigned to each symbolic spectral component 260 in expression 270. As a weight takes on values, it functions as a multiplier on the symbolic spectral component 260 to which it is assigned. In turn, the multiplier is applied to the actual color information 266 in indexed color description data 84 when symbolic spectral component 260 is used to index into indexed color description data 84 during evaluation of expression 270.

b. Defining the Picture Function and the Gamut Projector

FIGS. 6A through 6D conceptually illustrate the mathematical model of the problem statement. The N image pixel colors which result from evaluating the symbolic pixel expressions 80 each have three tristimulus values per pixel, and are collectively designated as a "picture" in "picture space". The N image pixel colors of the picture are represented by vector p. Vector p is a long vector comprised of 3N tristimulus values, built from a picture in scan-line order, and $p_i$ denotes the $i^{th}$ component of p, corresponding to one tristimulus value at one pixel. The set of image pixel colors evaluated from the symbolic pixel expressions 80 with the current object and light intensity values is designated as the picture, $p_0$. Since the spectra are functions of the weights, and the picture is a function of the spectra, a picture function, f, is defined which maps weights to tristimulus values in pixels. The picture function is denoted as $p = f(w)$. P is the subset of "picture space" containing all pictures for which there exists a weight vector w in weight space W such that $p = f(w)$. The picture function is vector-valued, and $f_i$ denotes the $i^{th}$ component function of p. Each component function is a low-order polynomial function in the weights, as illustrated by Equation (5), and thus is continuous and has easily computable derivatives of all orders.

A linear approximation to the picture function is developed which is used to search for the optimal set of weights to bring the picture into gamut. The matrix of first partial derivatives of the picture function, f(w), is a Jacobian matrix having dimensions of $3N \times M$, where the entry on the $i^{th}$ row and $j^{th}$ column is the partial derivative of $f_i$, with respect to $w_j$ (the $j^{th}$ component of w). This Jacobian matrix is denoted $J_f$. Because f is nonlinear, $J_f$ will depend on w.

The linear approximation to $p = f(w)$ is formed by truncating the Taylor series expansion of f after the second term:

$$p + \Delta p = f(w + \Delta w) \qquad (6)$$

$$p + \Delta p \approx f(w) + J_f \Delta w \qquad (7)$$

Because $p = f(w)$, the approximation that is made is $\Delta p \approx J_f \Delta w$.

The linear approximation just described is used to find the changes in the vector of weights, $w_0$, of the current picture function, $p_0$, that are needed to satisfy the picture function that represents the target picture, $p^*$. Target picture $p^*$ is also a function of a set of weights, designated as target weights $w^*$, such that $p^* = f(w^*)$. The target picture $p^*$ is produced by mapping the ideal or current picture to the gamut of the device (described in more detail below), so $p^*$ is not necessarily in P, since there may be no $w^*$ such that $p^* = f(w^*)$. In the implemented embodiment, the target weights $w^*$ are defined to be the weights needed to minimize some measure of distance between $p^*$ and the picture function $f(w_0)$. The weights, $w_0$, are already known, since $p_0 = f(w_0)$. Thus, the linear approximation of the picture function is used to find the changes in the weights needed to minimize some measure of distance between $p^*$ and the picture function $f(w_0)$. This distance is defined as a distance function, $d(p^*, f(w))$, and is the image metric, hereafter referenced as the objective or goodness function, of the optimization problem.

Figure 6A:
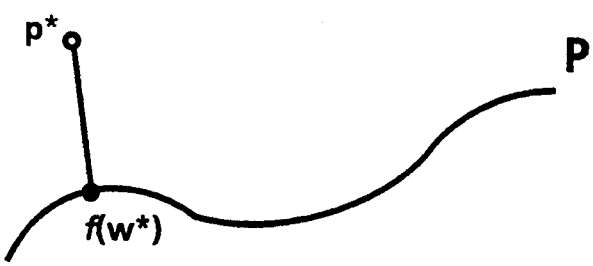
FIGS. 6A, 6B, 6C, and 6D conceptually illustrate a model of an image, or picture, function used according to an embodiment of the method of the present invention.

FIG. 6A illustrates the subset P of picture space, a target picture, p* which is not in P, and the picture in P, designated by picture function f(w*), which is the closest, in Euclidian distance, to the target picture. In the implemented embodiment, the distance function which produced acceptable picture results is defined as:

$$d(p^*, f(w)) = ||p^* - f(w)||^2 \qquad (8)$$

where $||.||$ denotes Euclidian distance. Thus, the distance between two pictures is measured by the squared Euclidian distance between them in picture space. Other goodness functions are also possible, and may be preferable to the distance function of Equation (8) for certain images or certain device gamuts. For example, a goodness function which describes the minimum distance from p to the most perceptually acceptable substitute for p* in G is a desirable goodness function.

Figure 6B:
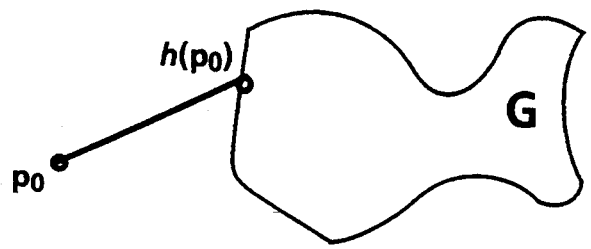

The gamut of the designated output medium is the region of three-dimensional tristimulus space, denoted $G_3$, that the device can render. A picture, p, is in gamut when all of its pixels are in gamut. All in-gamut pictures form a subset, G, of picture space P. There exists a "gamut projector" function, h, which maps a picture $p_0$ to the picture in G "closest" in Euclidian distance to $p_0$. FIG. 6B illustrates picture $p_0$ and the picture, $h(p_0)$ in G "closest" in Euclidian distance to $p_0$. Some picture p is the picture that minimizes $d(p_0, p)$ over all p in G. Note that gamut projector function h is the identity operator when $p_0$ is already in G: $h(p_0) = p$ for $p_0 \in G$.

Figure 6C:
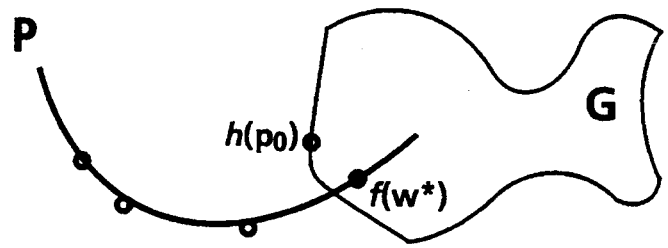

FIG. 6C illustrates one solution to the stated problem. In the search for the changes to the weights, w, for the picture that minimizes $d(p_0, p)$ over all p in G, first the gamut projector function h is applied to the picture $p_0$ to obtain the target picture $p^* = h(p_0)$. By the definition of h, p* is in gamut, but it may not be in P. Then, a nonlinear minimization process (described in detail below) is used to find changes in weights, w, which move picture $p_0$ in P toward p*. The goal of these two steps is to end at f(w*) which defines the picture in G which is the smallest distance from p*. Since p* is fixed, the distance that must be found depends only on w. In effect, the problem is to minimize a function $g(w) = d(p^*, f(w))$ with respect to w. The function is nonlinear, and a variety of nonlinear optimization techniques are applicable to the problem.

The problem of finding the optimum set of weights with which to scale the spectra to produce an in-gamut picture can now be briefly restated in the following form. Given an initial picture $p_0$, and an initial set of weights, $w_0$, such that $p_0 = f(w)$, the problem is to find the p that minimizes the distance $d(p_0, p)$ over all $p \in P \cap G$. For a picture p to be in the set $P \cap G$, p must be in gamut, and there must be a $w \in W$ such that $p = f(w)$.

The specific steps of the implemented nonlinear optimization technique are as follows. When the distance $d(p^*, f(w^*))$ is not expected to be too large at its minimum, the Gauss-Newton method may be used to find w*. The method is discussed by P. Gill, W. Murray, and M. Wright in *Practical Optimization*, at pages 134–136, which is hereby incorporated by reference. The method produces a sequence of w's which converge to w*. At each iteration, the next w is computed by choosing a direction in which to step w and a length for the step. The Jacobian of f, $J_f$, is used to compute the step directions, essentially linearizing the problem around the current value of w. Table 1 shows the general steps of the implemented method.

TABLE 1

Steps in Gauss-Newton Method

1. Evaluate $J_f$ at $w_i$, and let $\Delta p_i = p^* - p_i$;
2. Choose step direction $\Delta w_i$ to minimize $||\Delta p_i - J_f \Delta w_i||$ as follows:
   $\Delta w_i = J_f + \Delta p_i$ where $J_f+$ is the pseudo inverse of $J_f$;
3. Choose a step length, k, according to an estimate of how nonlinear f is;
4. Let $w_i + 1 \leftarrow w_i + k\Delta w_i$; let $p_i + 1 \leftarrow (f(w_i + 1))$;.
5. If the sequence $\{p_i\}$ has converged, exit; else let $i \leftarrow i + 1$ and return to step 1.

Figure 6D:
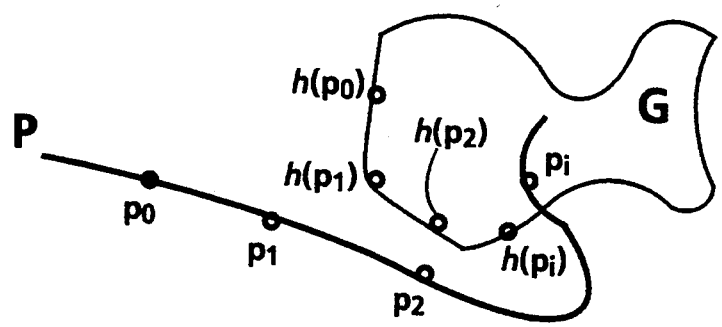

FIG. 6D illustrates that the steps just described alone will not guarantee that the picture which is the smallest distance from p* will be in G. Using the two steps just described results in picture $p_1$ being the closest picture to $h(p_0)$, but $p_1$ is not in G. A third step guarantees that the picture which is the smallest distance from p* will be in G. At every step in the nonlinear minimization process used to find weights, w, which move picture $p_0$ in P toward p*, the target picture p* is also recomputed so that there is a sequence of target pictures, $p_i^* = h(p_i)$, as shown in FIG. 6D. As long as there is some way to move the weights, w, the successive pictures, $p_i$, in P will continue to move in P toward the recomputed target pictures, $p_i^*$, into G, ending at $p_i$ as shown.

It can be seen from the process just described and from its illustration in FIG. 6D, that the process implemented in the illustrated embodiment does not necessarily keep the recomputed target picture $p^*_i$ close to the originally computed target picture $p^*_0$ in G. The final $p^*_i$ will not in general equal the initial one. The strategy just described treats all p in $P \cap G$ as equally good final in-gamut pictures, without regard to their distance from the original image. There may, however, be a modification to the model as implemented which would have as its goal finding the p in $P \cap G$ which is the "closest" to the original image, $p_0$.

C. The Process Flow of the Illustrated Embodiment

Figure 7:
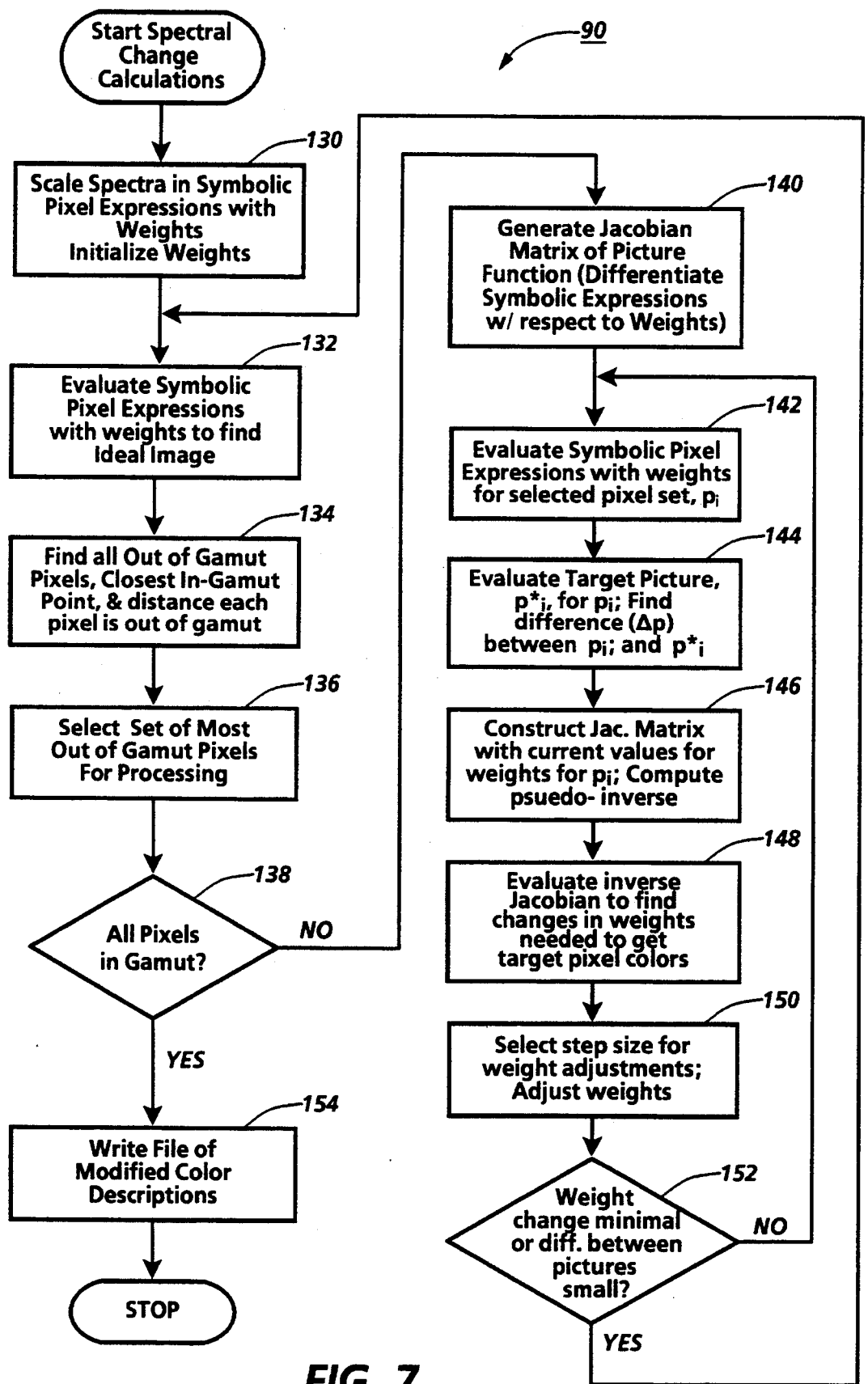
FIG. 7 is a flow chart illustrating the steps of one implementation of the method of the present invention.

FIG. 7 illustrates the steps in the implemented embodiment of device directed rendering method 90 which uses the mathematical model of the picture function described in Part B to produce a semantically consistent color image with in-gamut pixel colors. First, in box 130, each scene spectrum in each of the symbolic pixel expressions 80 is assigned a variable representing the value for the weight on that spectrum, producing for each pixel expression an equation in the form of Equation (5) expressing the pixel color value as a function of the weights. The weights are also initialized from the input spectra. The input spectra are read from a vector n, and the values for the weights are stored in a vector w. The resulting scaled spectra are stored in vector s. If the input spectrum, $n_i(\lambda)$ is an illuminant, the value of the corresponding weight $w_i$ is initially set to one (1), and the spectrum $s_i \leftarrow n_i$. The values for input spectra which are illuminants must be positive, and may be greater than one (1). Otherwise, the input spectrum, $n_i(\lambda)$ is a reflectance. The value for a spectrum which is a reflectance must fall between zero and one, and so the value of the corresponding weight $w_i$ is initially set to the largest input spectra value, and the spectrum $s_i \leftarrow n_i/w_i$. Thus, the largest value a weight may take on for a reflectance spectrum is one (1).

Other initialization functions may be performed in box 130 as well. For example, a number of user-specified thresholds are used to control subsequent processing steps, and these may be requested interactively from the user or otherwise entered into memory at this point.

Figure 1:
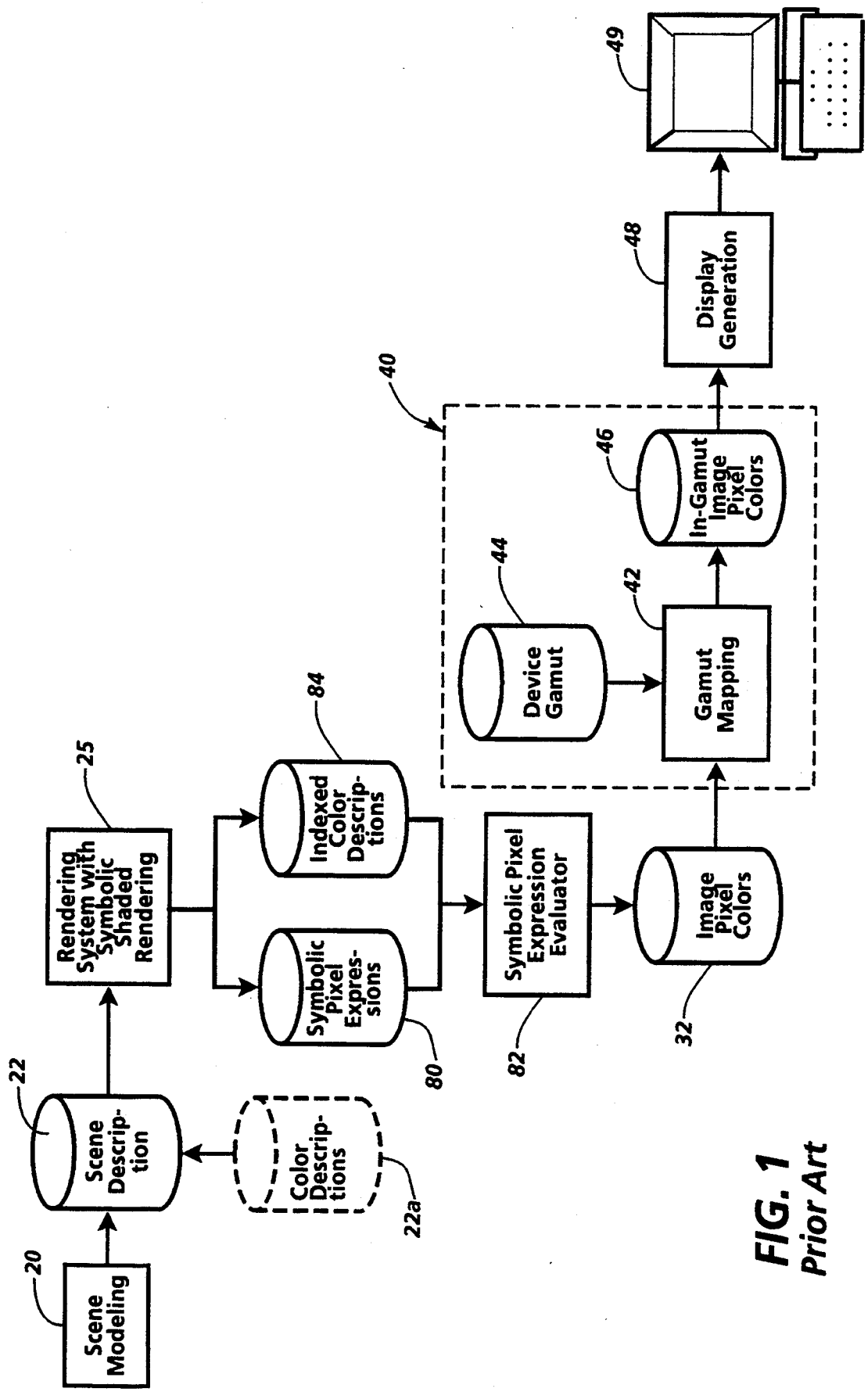
FIG. 1 is a block diagram illustrating the broad functional steps of a computer-based image synthesis and rendering system which utilizes symbolic shaded rendering to produce images in symbolic form.

In box 132, the symbolic pixel expressions 80 are then evaluated to produce a vector of evaluated pixels represented as tristimulus values. Evaluation step 132 is substantively similar to evaluation step 82 in FIG. 4, with modifications for handling the evaluated pixel expressions as a vector of spectral color information. The entire vector of values at this point is the initial picture, $p_0$, also called the "ideal" image, as produced by rendering system 25 (FIG. 1). All of the color and light intensity values in each symbolic pixel expression 80 which generate out-of-gamut pixel colors may be modified simultaneously, in the processing which follows. Typically, processing time and other implementation dependent decisions affect whether to modify all out-of-gamut colors at one time. In the illustrated embodiment, a selection of the "worst" pixel colors is made from all of the out-of-gamut pixels to reduce computational time. When these worst pixels are brought into gamut by adjusting the weights on the spectra, the picture is evaluated again, and a new set of "worst" pixels is selected for processing. This is illustrated in FIG. 7 by the presence of an outer loop which controls the selection of the worst out-of-gamut pixels, and an inner loop which minimizes the picture function to bring the pixels in-gamut. However, all out-of-gamut pixels could be adjusted simultaneously, if computational time and system resources permit.

The number, b, of "worst" pixel colors selected is arbitrary, and is primarily influenced by performance constraints. The manner for selecting the pixels, in boxes 134 and 136, is as follows. Each evaluated pixel color is mapped to the device gamut to determine (a) whether the pixel is out-of-gamut; and (b) for each pixel that is out-of-gamut, (i) what the closest, in-gamut pixel color is, and (ii) what the distance is in the color space between the out-of-gamut color and the closest in-gamut color. The list of out-of-gamut pixels is sorted in descending order by distance, and the b number of pixels having the largest distance values are selected for processing. The symbolic pixel expressions 80 with weighted spectra which represent these worst pixels form the basis of the picture function, $p_0$, which is the current ideal image.

In box 138, the inquiry is made whether all, or substantially all, of the pixels just evaluated are in the gamut of the designated output medium. This inquiry controls the outer loop of processing. When all pixels are in-gamut, processing is concluded, and the current set of evaluated pixels colors represent a color image which is semantically consistent and which has image pixels that are within the gamut of the output medium. Control then transfers to box 154, where the file of modified indexed color description data is produced. The current values for the weights contain the scale factors to be applied to the original indexed color descriptions (file 84 in FIG. 3) to produce the modified color description data (file 86 in FIG. 3). The process in box 154 applies each weight to its corresponding original color description according to the index in the symbolic pixel expression, and writes a data structure of modified color information data with corresponding indices.

The inquiry in box 138 may also permit the user to specify some user threshold to terminate processing. This threshold may specify for example, that each evaluated pixel must be within some small range of distance from the gamut (a "close enough" threshold), or that some percentage of pixels must be within the gamut to conclude processing.

When the inquiry in box 138 is not satisfied, the symbolic expressions of the picture function, $p_0$, defined by the b selected pixels, are differentiated with respect to the weights to form the Jacobian matrix, in box 140, and inner loop processing begins in box 142. The inner loop processing represents the specific processing steps needed for minimizing the goodness function, which in the illustrated embodiment is the squared Euclidian distance between two pictures in picture space. As noted above, the Jacobian matrix relates movements of the pixels to movements of the weights: $J_f \Delta w_i = \Delta p_i$. The expression for each pixel in this matrix contains symbolic expressions $w_i$ for weights on the spectra.

In box 142, $P_0$ is now denoted as $p_i$, since minimizing the distance between two pictures may take several iterations of the inner loop, and with each iteration $p_i$ changes as weights are adjusted. In box 142, $p_i$, the set of the b worst pixels, is evaluated with respect to the current settings of the weights. These evaluated pixels are then mapped to the device gamut in box 144, using gamut projector function, h, which may be any conventional gamut mapping method. The mapping to the gamut of picture $p_i$ produces a target picture $p^*$, a list of in-gamut pixels. Then, also in box 142, the difference $\Delta p$ between each pixel color in the current picture $p_i$ and the target picture $p^*$ is computed.

In boxes 146 and 148, the specific Jacobian matrix for picture $p_i$ is constructed and its pseudo-inverse computed, using any standard technique, to find the direction in which to move the weights to bring the current picture closer to the target picture in picture space. In box 150, a step size is selected for the weights, according to how nonlinear picture function $f(w_i)$ is. In the illustrated embodiment, the step size takes on a user-specified value m between 0 and 1. If the largest absolute value in the vector of weight changes computed from the pseudo-inverse of the Jacobian is greater than m, the step size is set to m; otherwise, the step size is set to one (1). The new weights are found from $w_{i+1} \leftarrow w_i + k \Delta w_i$.

In box 152, an inquiry is made as to whether the inner loop processing is completed. In essence the inquiry is whether the current picture of the b worst pixels from the outer loop satisfies the goodness function. The inquiry is made here because the most recent set of computed changes for the weights provides information as to how the current picture is "converging" on the target picture. The specific inquiry in box 152, then, includes two tests. The first is whether the absolute value of the largest distance difference between the current picture and the target picture is within a user-specified distance. The second is whether the absolute value of the largest change in the weights computed from the Jacobian pseudo-inverse is smaller than a user-specified quantity, that is, too minimal to try another iteration of weight changes. If either test is true, processing of the inner loop is terminated, and processing continues in box 132. If either test is not true, however, the distance function may be minimized further, and processing is transferred to the top of the inner loop at box 142.

D. Machine Configurations

Figure 8:
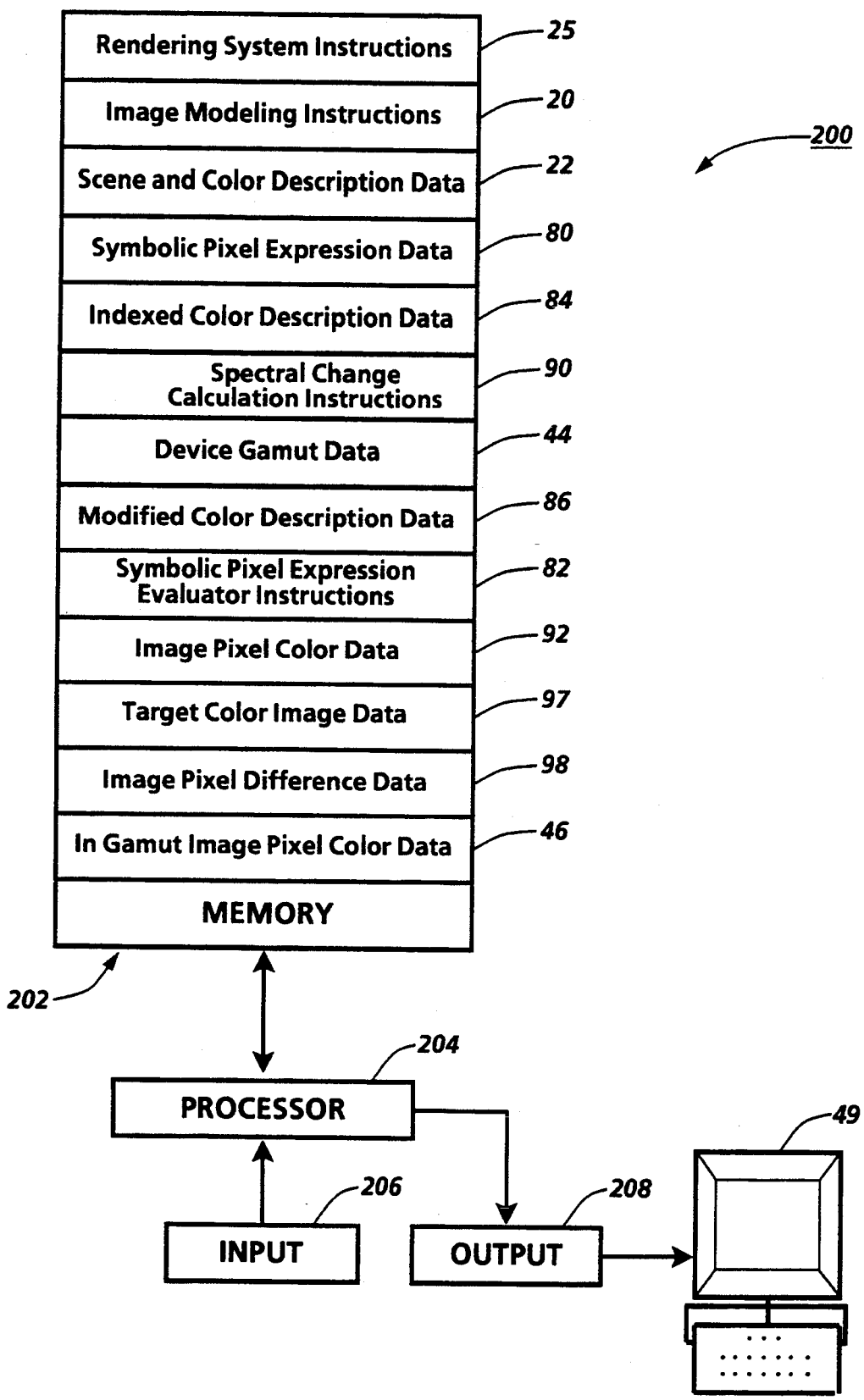
FIGS. 8, 9, and 10 are block diagrams of suitable machine configurations which may be operated according to the present invention.
Figure 9:
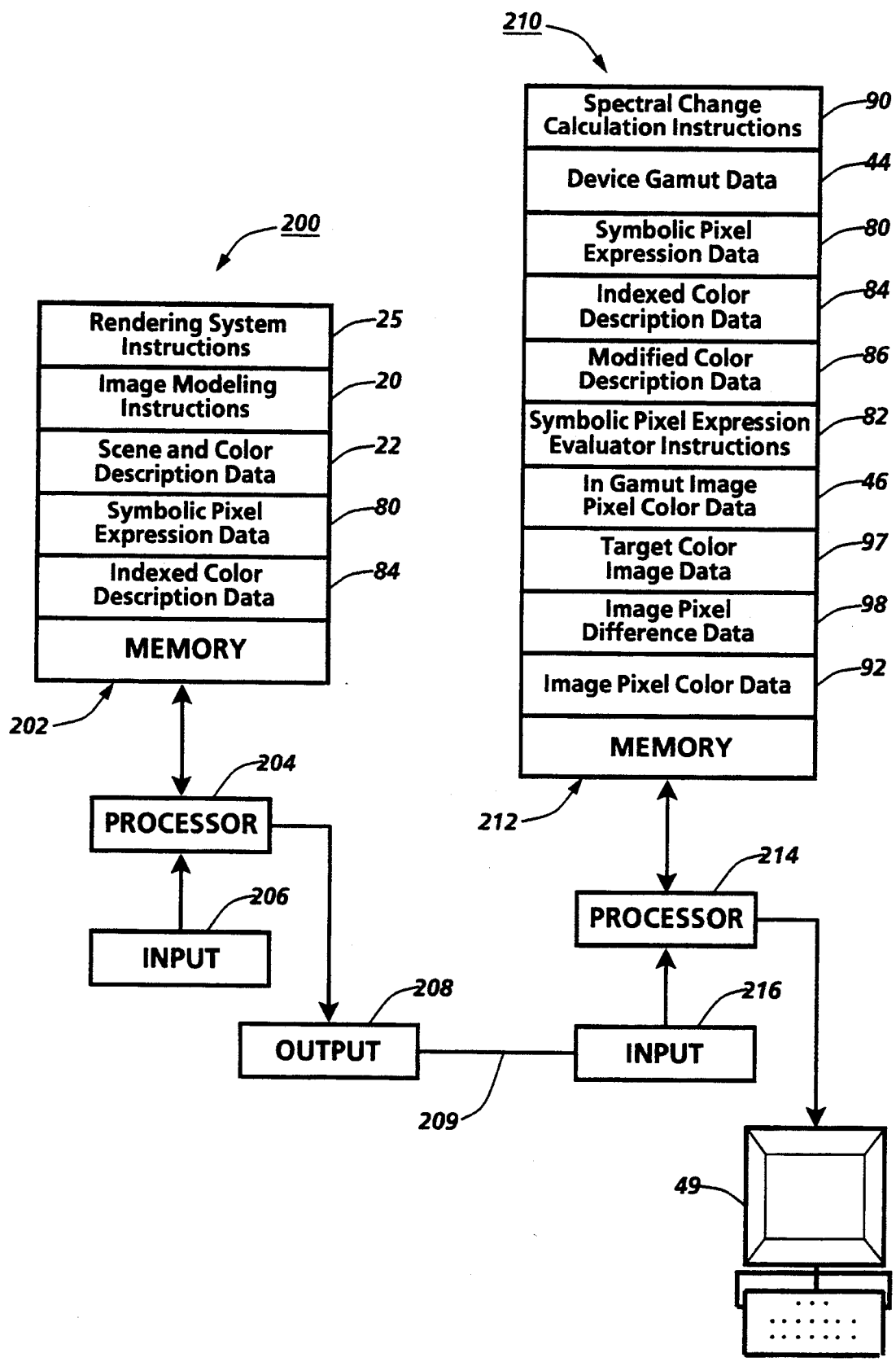
Figure 10:
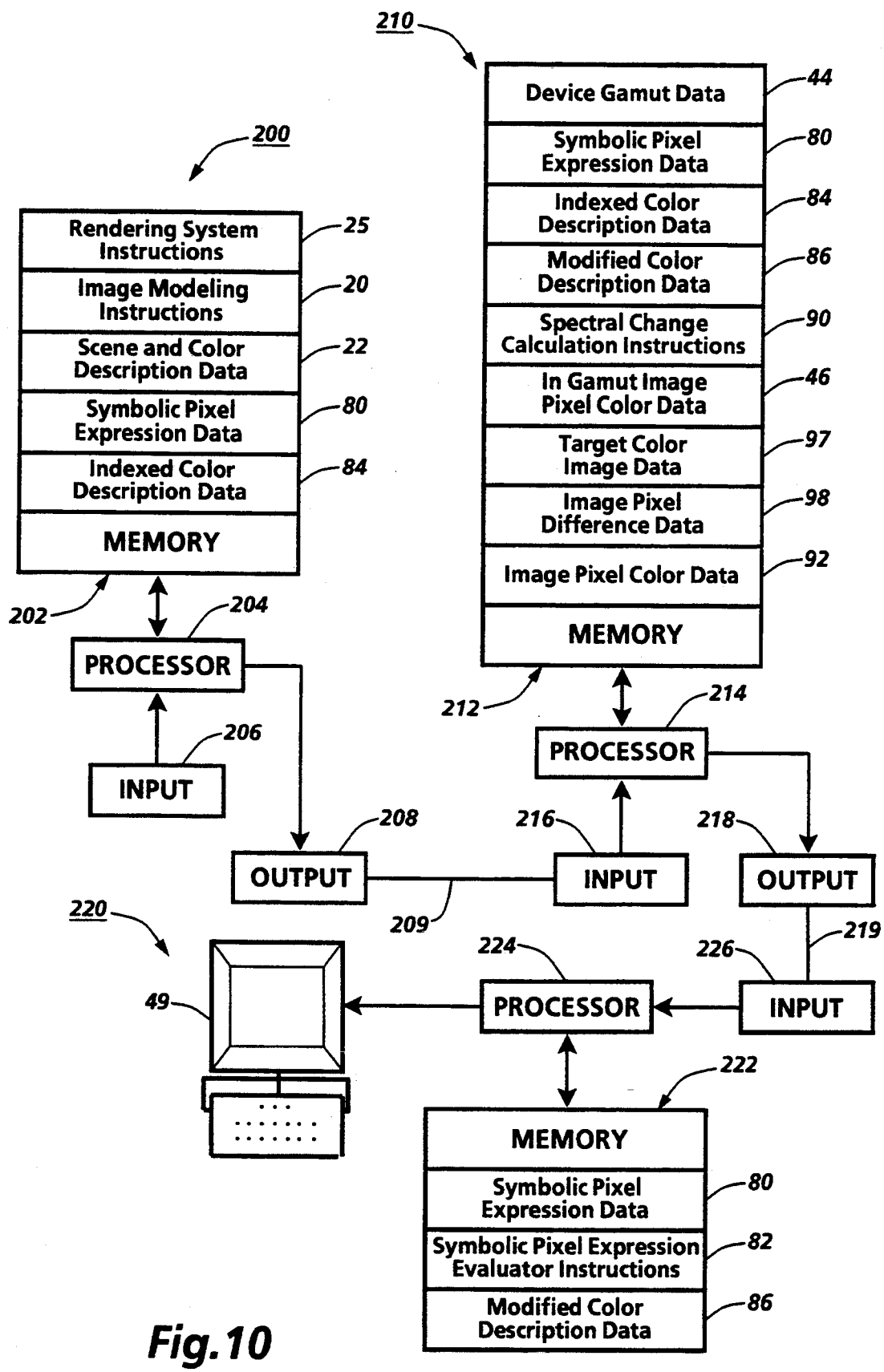

The method of the present invention may be used for operating a processor-controlled machine, such as a general purpose digital computer or a machine having a digital computer as a component part. In addition, the present invention may be a machine which includes a processor for executing instructions which accomplish substantially similar results as the method of the present invention. FIGS. 8, 9, and 10 illustrate several machine configurations for which the present method and machine inventions are suitable. FIG. 8 is a simplified functional block diagram illustrating the components of a processor-controlled machine 200 (hereinafter, "system 200"). System 200 may be a standalone system, such as a microcomputer-based graphics workstation, which is suitable for performing the scene modeling and creation of the scene description, the rendering of the image with symbolic shaded rendering system 25, the spectral change calculations method 90 of the present invention, and display of the in-gamut final color image on output device 49. The components of system 200 include a processor 204 and at least one memory unit 202. Memory unit 202 includes ROM and RAM in which are stored the program instructions for scene modeling application 20, rendering system 25, spectral change calculator 90, and symbolic pixel expression evaluator instructions 82. Memory 202 also stores data needed during execution of the program instructions, including the scene description 22, indexed color description data 84, the symbolic pixel expressions 80, and device gamut data 44.

In each of the systems illustrated in FIGS. 8, 9, and 10, processors 204, 214, and 224 are each connected for access to and in communication with a respective memory unit, and each processor controls the execution of program instructions and the retrieval of data from the memory. Processor 204, 214, and 224 may be any appropriate processor. In system 200, processor 204 also controls the transfer of pixel information signals representing pixel image data from memory to output circuitry which includes output unit 49.

Input units 206, 216, and 226 may include any suitable device and associated input circuitry for interacting with scene modeling application 20, rendering system 25, and spectral change calculator 90. Suitable devices include but are not limited to pointing and cursor control devices for two- and three-dimensional displays, such as a mouse or light pen, alphanumeric input devices such as a keyboard, and touch screen displays.

The output units of system 200, system 210, and system 220 may be any appropriately connected color device suitable for displaying computer generated color image data, such as a cathode ray tube (CRT) raster scan color monitor or a color liquid crystal display. Other devices suitable as output units in place of display 49 include color reproduction devices, such as an electronic or digital printer, xerographic marking engine, platemaking device, or other suitable color rendering device. In addition, the output unit may be a data communications device for connecting to a communications line, as shown in FIGS. 9 and 10, whereby data created according to the method of the present invention may be transmitted to other suitably configured systems for further processing or for display or reproduction.

In FIG. 9, another machine configuration having two, similarly configured, processor-controlled machines is illustrated. System 200 is connected to system 210 through communications link 209, which may be any conventional network communications connection between the two machines. System 200, which may be a graphics workstation, is operated to execute rendering system instructions 25 to generate symbolic pixel expression file 80 and indexed color description data 84, which together represent the data needed for a rendered color image, and which may be stored in memory 202. Processor 204 controls the communication of symbolic pixel expression file 80 and indexed color description data 84 to receiving system 210 through output unit 208. System 210, which may be a networked, microcomputer or workstation, receives symbolic pixel expression file 80 and indexed color description data 84 from system 200 through communications link 209, and executes spectral change calculation instructions 90 and symbolic pixel expression evaluator instructions 82 to produce the in-gamut image pixel color data 46 needed for displaying the in-gamut rendered color image on output display 49 of system 210.

FIG. 10 illustrates still another machine configuration having three processor-controlled machines connected through communications links 209 and 219. In this implementation, system 210, which may be a networked file server, a networked document processing machine, or the like, receives symbolic pixel expression file 80 and indexed color description data 84 from system 200 through communications link 209, and executes spectral change calculation instructions 90 to produce the modified, in-gamut color description data 86 needed to generate an in-gamut rendered color image. System 220 then receives, through communications link 219, the in-gamut color description data 86 and symbolic pixel expressions 80 and stores them in memory 222. Processor 224 then executes the instructions for symbolic pixel expression evaluator 82, also stored in memory 222, to produce the in-gamut image pixel color data composing the final color image having colors which are in the gamut of designated output medium 49. Processor 224 then transfers the in-gamut image pixel color data to output medium 49 for display or reproduction.

The three illustrated machine implementations of the method of the present invention are not intended to illustrate all possible configurations, and other machine implementations of the functional steps of the method of the present invention are also possible. For example, in FIG. 10, system 210 could also generate the in-gamut image pixel color data 46 using symbolic pixel expression evaluator 82, thereby creating the data which represents the final color image having colors which are in the gamut of designated output medium 49 of system 220. System 220 could then receive the in-gamut image pixel color data 46 through communications link 219, for display on output medium 49 without further processing. The dotted line 88 of FIG. 3 represents the combination of spectral change calculator process 90 with symbolic pixel expression evaluator process 82 implemented on a single machine.

E. Miscellaneous Implementation Details of the Illustrated Embodiment

The method of the present invention was implemented on a Sun Microsystems SPARCstation Model 2 with a 24 bit color display, running the Unix BSD 4.2 operating system. Renderer 25 (FIG. 1) used in the illustrated embodiment was implemented as a ray tracing rendering method from a simple public domain ray tracer, available at the time of implementation via anonymous ftp from "princeton.edu" under the name of "MTV".

The gamut projector function h may be implemented as any suitable gamut mapping process known in the art. In the illustrated embodiment, a very simple gamut mapping process is used which projects each out-of-gamut pixel in the current ideal image, picture $p_0$, onto the position in the gamut in RGB color space closest to the out-of-gamut pixel position. Table 2 contains the program code, in Mathematica, to implement this simple gamut projector function to find the signed distance from an ideal image pixel color to the closest point in the RGB color space:

TABLE 2

Gamut Projector Code

```
(* XYZtoRGB from Hall, for Cornell monitor *)
XYZtoRGB:={{1.967,-0.955,0.064},{-0.548,1.938,-0.130},{-0.297,-0.027,0.982}};
RGBtoXYZ:=Inverse[XYZtoRGB];
(* spectrum to RGB and XYZ *)
spectrumToXYZ[s_]: = {s.xbar, s.ybar, s.zbar}
spectrumToRGB[s_]: = spectrumToXYZ[s]. XYZtoRGB
(* find the signed distance from the value to the unit interval *)
unitDistance[x_]: = Which[x<0, -x, x>1, 1-x, True, 0];
(* find the magnitude of the distance vector from the point to the unit cube *)
cubeDistance[pt_]: = Sqrt[Apply[Plus, Abs[Map[unitDistance, pt]] ^ 2]];
```

FIGS. 12A and 12B contain the program code, designated as reference numeral 160 in both figures, to implement the steps shown in FIG. 7. The program was written in Mathematica, a general software system and programming language intended for mathematical and other applications. Additional information about Mathematica is available in a number of references, including, for example, Wolfram, Stephen, *Mathematica: A System for Doing Mathematics by Computer*, Addison-Wesley Publishing (2nd Ed. 1991), and in other references listed therein on pages xviii and xix. The program code in FIGS. 12A and 12B, when executed on the Sun SPARCstation 2, as described and configured above, generally follows the implementation described in relation to FIG. 7. Nonetheless, the code may differ from the above description in various ways. For example, the code may be divided into procedures or routines differently than described above. Machines such as systems 200, 210, and 220 illustrated in FIGS. 8, 9, and 10 may be operated to perform the processes of spectral change calculations method 90 described above in conjunction with FIGS. 4 and 7 by running the program code illustrated in FIGS. 12A and 12B, or by running program code having the equivalent functions as described in FIGS. 4 and 7.

In an alternative, interactive implementation of the illustrated embodiment, the scene description 22 may initially contain arbitrary color indices instead of actual color spectra. Renderer 25 would produce the symbolic pixel expressions 80 and a file 84 of color indices. The scene designer or other user then assigns actual spectral colors to each color index in the indexed color description data 84 prior to the execution of method 90. This implementation would give a user access to the original color and light intensity values in color description data 84 for purposes of modifying those values prior to further processing. Such a capability would permit the user, for example, to change the entire color scheme of the image at the object primitive level without re rendering the image.

Rendering system 25 was also modified to provide user control over the process of indexing the spectra in the scene, so that objects or lights which shared the same unique color could either be indexed with the same index, or with independent indices. This permits the scene designer to control whether changes to a unique color will affect only a single object or light, or will affect all objects and lights sharing the same spectrum.

In the illustrated embodiment, there is also a facility for allowing the user to "lock" certain spectra. Locked spectra are object or light colors which are fixed and which do not get adjusted during the processing. This may be useful for improving the processing speed and computational resources required for complicated images with large numbers of objects in them. When this facility is implemented, during the evaluation of the symbolic pixel expressions, the locked spectra are evaluated as a number without a weight variable assigned.

Also with reference to the illustrated embodiment, in order to bring all pixel colors into gamut by adjusting single weights on the lights and surface spectra, each pixel must be defined by at least two basis vectors, and the volume defined by the vectors must intersect the gamut somewhere other than at (0,0,0), or black. The tristimulus vectors themselves need not be in gamut. However, visible light sources, and colors that are simple products of the light and surface spectra (the equivalent of the diffuse component in simple shading models) cannot be corrected if their chromaticity is out of gamut, and a more complex set of weights is needed to solve chromaticity problems for such colors.

The method of the present invention may be generalized and individually adjusted by an image designer to design an image according to certain requirements. In the most general, unconstrained application of the method, the spectra for both lights and surfaces may be adjusted to fine tune a scene in order to get the colors in gamut for a particular output medium. As noted above, many monitor-to-print applications typically fall into this category. In the case where the surface reflectances for the scene objects are to remain fixed, only the relative brightness of the lights should be adjusted, and the method may be modified to change spectral weights on the light sources only. In another case, the designer may want to fix the brightness of the lights in the scene, but allow the surface reflectances to change, for example in the case where the designer is creating a sequence of images under the same illumination for consistency. Thus, the method may be modified to change spectral weights on the object surfaces only, and the lightness and perhaps the absolute colors of scene objects may change accordingly.

In recapitulation, the method of the present invention modifies individual object and light source scene spectra in order to produce a rendered color image having colors that are directly displayable or reproducible on a selected output medium without an additional gamut mapping step applied to individual image pixels. The image produced by the method preserves semantic relationships and consistency among the objects in the image while taking advantage of the widest range of colors available in the output medium's gamut. By changing the scene description rather than individual image pixels, the introduction of shading artifacts is avoided, and changes in the relative brightness of objects and in pixel chromaticity, in certain instances, are permitted.

While this invention has been described in conjunction with a specific embodiment, the illustrated and described embodiment is only illustrative of the invention. Various alternatives, modifications and variations can be devised by those skilled in the art. Accordingly, the present invention is intended to embrace all such alternatives, modifications and variations as fall within the scope of the following claims.

What is claimed:

1. A method of producing an output color image having colors included in a device gamut of a color reproduction device; the method comprising:

providing symbolic color image data symbolically representing a plurality of original image colors from an original color image rendered from a scene description having a plurality of object primitives;

providing indexed color description data defining an original color for each of the object primitives in the scene description; the symbolic color image data being indexed by the indexed color description data so that evaluating the symbolic color image data using the indexed color description data produces the plurality of original image colors of the original color image;

providing device gamut color data representing the device gamut of the color reproduction device;

performing spectral change calculations using the symbolic color image data, the indexed color description data, and the device gamut color data to produce modified indexed color description data; the spectral change calculations modifying the indexed color description data until the output color image satisfies an image metric defining a desired relationship among the original color image, the device gamut and the output color image; and producing the output color image having the colors included in the device gamut of the color reproduction device using the symbolic color image data and the modified indexed color description data.

2. The method of claim 1 wherein performing spectral change calculations includes (a) determining color modification data to be used to modify the indexed color description data;

(b) evaluating the symbolic color image data with the indexed color description data and the color modification data to generate a current color image composed of a plurality of modified colors;

(c) generating a target color image from the current color image using the device gamut color data; each of a plurality of target colors composing the target color image being one of the colors included in the device gamut of the color reproduction device and corresponding to one of the modified colors of the current color image;

(d) using the plurality of target colors composing the target color image to determine whether the current color image satisfies the image metric defining the desired relationship between the original color image, the device gamut and the output color image;

(e) if the current color image does not satisfy the image metric, repeating (a), (b), (c), and (d) until the current color image satisfies the image metric; and (f) modifying the indexed color description data with the color modification data to produce the modified indexed color description data.

3. The method of claim 2 wherein each modified color of the plurality of modified colors composing the current color image and each corresponding target color of the plurality of target colors composing the target color image is represented as a point in a color space mathematically representing colors; and the image metric defines the desired relationship between the original color image, the device gamut and the output color image according to a distance in the color space between one of the modified colors in the current color image and the corresponding one of the plurality of target colors in the target color image.

4. A method of producing an output color image comprising:

(a) assigning one of a plurality of change variables to a respective one of a plurality of symbolic color image data items; each change variable having a current value;

(b) evaluating the plurality of symbolic color image data items using a plurality of indexed color description data items each indexed to respective ones of the symbolic color image data items to produce a current color image composed of current colors; each current value of one of the plurality of change variables being applied to the indexed color description data item indexed by the respective ones of the symbolic color image data items;

(c) generating, from the current colors of the current color image, a target color image using device gamut color data defining a gamut of device colors of a color reproduction device; each of a plurality of target colors composing the target color image being one of the device colors in the gamut and corresponding to a respective one of the current colors of the current color image;

(d) calculating difference data between each of the current colors and the corresponding one of the target colors;

(e) determining an incremental change quantity for the current value of each of the plurality of change variables using the difference data;

(f) determining from the difference data and from the incremental change quantities whether the current color image satisfies image metric data defining a desired relationship between the current color image and the output color image;

(g) if the current color image does not satisfy the image metric data, updating the current value of each of the change variables with the incremental change quantity therefor, and repeating steps (b), (c), (d), (e), (f) and (g); and (h) applying the current value of each change variable to the indexed color description data item indexed by the respective symbolic color image data item to which the change variable was assigned to produce modified indexed color description data items; the modified indexed color description data items, when evaluated with the symbolic color image data items, producing the output color image.

5. The method of claim 4 wherein each modified color of the plurality of modified colors composing the current color image and each corresponding target color of the plurality of target colors composing the target color image is represented as a point in a color space mathematically representing colors; and the image metric data defines the desired relationship between the current color image and the output color image according to a distance in the color space between one of the current colors in the current color image and the corresponding target color in the target color image.

6. A method of operating a machine to produce an output color image having in-gamut colors included in a device gamut of a color reproduction device; the machine including a memory for storing data and a processor connected for accessing and storing the data in the memory;

the method comprising:
(a) operating the processor of the machine to assign a change variable to a symbolic spectral component included in each of a plurality of symbolic color image data items stored in the memory of the machine; each of the symbolic color image data items defining one of a plurality of original image pixel color data items composing an original color image rendered from a scene description;
(b) operating the processor of the machine to determine a new value for the change variable to produce a modified symbolic spectral component;
(c) operating the processor of the machine to evaluate each symbolic color image data item including the modified symbolic spectral component using one of a plurality of indexed color description data items to produce image pixel color data items composing a current color image; each indexed color description data item defining an original color of one of a plurality of object primitives in the scene description; the symbolic spectral component included in each symbolic color image data item indexing a respective one of the plurality of indexed color description data items to the symbolic color image data item;
(d) operating the processor of the machine to produce a plurality of target image pixel color data items composing a target color image from the image pixel color data items composing the current color image using a plurality of device gamut color data items representing the device gamut of the color reproduction device; each target image pixel color data item being a device color in the device gamut;
(e) operating the processor to determine if the current color image satisfies an image metric defining a desired relationship between the original color image and the output color image;
(f) if the current color image does not satisfy the image metric, operating the processor to repeat steps (b), (c), (d), and (e) until the current color image satisfies the image metric; and
(g) operating the processor to apply the new value of the change variable assigned to the symbolic spectral component to the respective indexed color description data item indexed thereto to produce a plurality of modified indexed color description data items; the plurality of modified indexed color description data items, when evaluated with the symbolic color image data items, producing the output color image having the in-gamut colors.

7. The method of claim 6 wherein operating the processor to determine a new value for the change variable includes the steps of:
(b.1) operating the processor to determine an incremental change quantity from a current value of the change variable; and
(b.2) operating the processor to apply the incremental change quantity to the current value of the change variable to obtain the new value.

8. The method of claim 7 wherein each symbolic color image data item includes a symbolic pixel function of the change variable and the symbolic spectral component; and
wherein the step of operating the processor to determine an incremental change quantity includes:
(i) operating the processor to differentiate each symbolic pixel function with respect to the change variable therein to produce a differentiated symbolic pixel function;
(ii) operating the processor to construct a jacobian matrix in the memory of the machine from the differentiated symbolic pixel function;
(iii) operating the processor to compute and store in the memory of the machine a pseudo-inverse jacobian matrix from the jacobian matrix; and
(iv) evaluating the pseudo-inverse jacobian matrix using the current value of each change variable to find the incremental change quantity for each change variable.

9. The method of claim 6 further including, after step (a) and before (step (b),
(a.1) operating the processor of the machine to initialize the change variable with an initial value having no modification effect on the symbolic spectral component;
(a.2) operating the processor of the machine to evaluate each symbolic color image data item using the respective one of the indexed color description data items indexed thereto to produce the plurality of original image pixel color data items composing the original color image;
(a.3) operating the processor of the machine to store the original image pixel color data items in the memory of the machine; and
wherein each original image pixel color data item composing the original color image and each target color pixel color data item composing the target color image is represented as a point in a color space mathematically representing colors; and
wherein the desired relationship defined by the image metric is a distance quantity in the color space between each of the original image pixel color data items composing the original color image and a corresponding one of the target image pixel color data items; and
wherein the current color image satisfies the desired relationship defined by the image metric when the distance quantity is minimized.

10. A machine comprising:
input circuitry for obtaining symbolic color image data items and indexed color description data items; each indexed color description data item defining an original color of one of a plurality of object primitives in a scene description; each symbolic color image data item defining one of a first plurality of image pixel color data items composing an original color image rendered from the scene description; the symbolic color image data items having symbolic spectral components indexing the indexed color description data items to the symbolic color image data items;
memory for storing the symbolic color image data items and the indexed color description data items;
output circuitry for connecting the machine to an output medium and for transferring selected data from the memory to the output medium; and a processor connected for accessing the input circuitry to receive the symbolic color image data items and the indexed color description data items and to store the symbolic color image data items and the indexed color description data items in the memory; the processor further being connected for accessing the output circuitry to transfer the selected data from the memory to the output circuitry;

the processor further being connected for accessing the data stored in the memory; the data stored in the memory further including:

device gamut color data items representing a gamut of device colors capable of reproduction by a color reproduction device; and instruction data indicating instructions the processor executes;

the processor, in executing the instructions, performing spectral change calculations using the symbolic color image data items, the indexed color description data items, and the device gamut color data items to produce modified indexed color description data items; the spectral change calculations modifying the indexed color description data items so that the modified indexed color description data items, when evaluated with the symbolic color image data items, produce a second plurality of image pixel color data items composing an in-gamut color image; the in-gamut color image satisfying an image metric defining a relationship between the original color image, the gamut of device colors and the in-gamut color impact; the processor further, in executing the instructions, storing the modified indexed color description data items in the memory.

11. The machine of claim 10 wherein the processor further, in executing the instructions, transfers the modified indexed color description data items and the symbolic color image data items from the memory to the output circuitry; the output circuitry transferring the modified indexed color description data items and the symbolic color image data items to the connected output medium.

12. The machine of claim 11 wherein the connected output medium is a data communications circuit.

13. The machine of claim 10 wherein the processor further, in executing the instructions, evaluates the symbolic color image data items with the modified indexed color description data items to produce the second plurality of image pixel color data items composing the in-gamut color image; and wherein the processor further, in executing the instructions, transfers the second plurality of image pixel color data items to the output circuitry for transferring to the output medium.

14. The machine of claim 13 wherein the output medium is the color reproduction device having the gamut of device colors represented by the device gamut color data items stored in the memory of the machine.

15. The machine of claim 13 wherein the output medium is a data communications circuit.

* * * * *